(12) United States Patent
Kuramoto

(10) Patent No.: US 9,832,120 B2
(45) Date of Patent: Nov. 28, 2017

(54) PACKET ROUTING APPARATUS, INTERFACE CIRCUIT AND PACKET ROUTING METHOD

(71) Applicant: FUJITSU LIMITED, Kawasaki-shi, Kanagawa (JP)

(72) Inventor: Michio Kuramoto, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 47 days.

(21) Appl. No.: 14/587,169

(22) Filed: Dec. 31, 2014

(65) Prior Publication Data
US 2015/0207735 A1 Jul. 23, 2015

(30) Foreign Application Priority Data
Jan. 21, 2014 (JP) .................................. 2014-008713

(51) Int. Cl.
*H04L 12/747* (2013.01)
*H04L 12/721* (2013.01)
*H04L 12/743* (2013.01)

(52) U.S. Cl.
CPC ............ *H04L 45/742* (2013.01); *H04L 45/66* (2013.01); *H04L 45/7457* (2013.01)

(58) Field of Classification Search
CPC ..... H04L 12/742; H04L 45/66; H04L 45/742; H04L 12/747; H04L 12/56
USPC ................................ 370/389, 401, 412, 470
See application file for complete search history.

(56) References Cited

U.S. PATENT DOCUMENTS

| | | | |
|---|---|---|---|
| 2004/0146044 A1 | 7/2004 | Herkerdorf | |
| 2006/0098687 A1* | 5/2006 | Singh | H04L 12/2854 370/470 |
| 2012/0008633 A1* | 1/2012 | Kuramoto | H04L 12/4625 370/401 |
| 2012/0300778 A1* | 11/2012 | Tamura | H04L 12/66 370/392 |

(Continued)

FOREIGN PATENT DOCUMENTS

| | | |
|---|---|---|
| JP | 2000-41065 | 2/2000 |
| JP | 2004-221807 | 8/2004 |

(Continued)

OTHER PUBLICATIONS

Japanese Office Action dated Aug. 29, 2017 from Japanese Patent Application No. 2014-008713, 9 pages.

*Primary Examiner* — Charles C Jiang
*Assistant Examiner* — Wali Butt
(74) *Attorney, Agent, or Firm* — Staas & Halsey LLP

(57) ABSTRACT

A packet routing apparatus includes a plurality of interface units each includes, a first memory in which a plurality of routing information used in a routing of a packet are stored, a second memory in which the plurality of routing information are stored, the number of the routing information stored in the second memory being smaller than the number of the routing information stored in the first memory, and a retrieval unit configured to detect a packet length of the packet received at any of the plurality of ports, perform the routing based on the plurality of routing information stored in the second memory when the detected packet length is less than a predetermined value, and perform the routing based on the plurality of routing information stored in the first memory when the detected packet length is greater than or equal to the predetermined value.

6 Claims, 15 Drawing Sheets

(56) References Cited

U.S. PATENT DOCUMENTS

2015/0092781 A1* 4/2015 Gerber .................... H04L 45/00
370/392

FOREIGN PATENT DOCUMENTS

| JP | 2004-524754 | 8/2004 |
| JP | 2005-252815 | 9/2005 |
| JP | 2009-017439 | 1/2009 |
| JP | 2009-130891 | 6/2009 |
| JP | 2011-239299 | 11/2011 |

* cited by examiner

PACKET ROUTING APPARATUS, INTERFACE CIRCUIT AND PACKET ROUTING METHOD

CROSS-REFERENCE TO RELATED APPLICATION

This application is based upon and claims the benefit of priority from the prior Japanese Patent Application No. 2014-008713 filed on Jan. 21, 2014, the entire contents of which are incorporated herein by reference.

FIELD

The embodiments discussed herein are related to a packet routing apparatus, an interface circuit, and a packet routing method.

BACKGROUND

Conventionally, a packet routing apparatus such as a layer 2 switch has been utilized as an apparatus which retrieves a transfer path of a received packet. In order to cope with the increased speed in packet communication, it has been effective for the packet routing apparatus to install thereon a memory with which an optimum path may be retrieved in a short time among multiple path candidates. Such a memory may include, for example, TCAM (Ternary Content Addressable Memory) having three values of 0 (zero), 1 (one) and a mask value. The TCAM specifies the path information suitable for the received packets among the multiple path information stored in, for example, a large capacity MAC (Media Access Control) address table based on the header information of the received packets. The packet routing apparatus may use the TCAM to instantly transfer the packets received from different apparatuses to a desired transfer destination apparatus via a retrieved path.

A related technique is disclosed in, for example, Japanese Laid-Open Patent Publication No. 2009-17439.

SUMMARY

According to an aspect of the invention, a packet routing apparatus includes: a plurality of interface units each including a plurality of ports configured to transmit and receive a packet; and a switch unit configured to transmit the packet received from one of the plurality of ports to other ports, based on a destination address of the packet, wherein each of the plurality of interface units includes, a first memory in which a plurality of routing information used in a routing of the packet are stored, a second memory in which the plurality of routing information are stored, the number of the routing information stored in the second memory being smaller than the number of the routing information stored in the first memory, and a retrieval unit configured to detect a packet length of the packet received at any of the plurality of ports, perform the routing based on the plurality of routing information stored in the second memory when the detected packet length is less than a predetermined value, and perform the routing based on the plurality of routing information stored in the first memory when the detected packet length is greater than or equal to the predetermined value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The TCAM has especially high power consumption among devices which constitute a packet routing apparatus in that the TCAM has an architecture in which electrical current is supplied and discharged to and from the entire region thereof for each memory retrieval (access) which is a different aspect from a typical memory. Further, since the packet routing apparatus simultaneously handles various traffics according to, for example, the type of packet, the power consumption for an average-case traffic is markedly different from that for a worst-case traffic. Particularly, as compared to other devices, the TCAM is susceptible to an influence of traffic variation. Therefore, only the load imposed on the TCAM among the devices within the apparatus may be increased depending on a traffic pattern, so that the power consumption of the TCAM is abruptly increased. An increase of power consumption is accompanied with an increase of temperature, so that the increase of power consumption leads to an important problem in terms of the increase of temperature of the entire apparatus in the worst-case. Accordingly, it is required that the power consumption of a single memory entity for retrieval including the TCAM is suppressed.

Hereinafter, descriptions will be made on embodiments of a packet routing apparatus, an interface circuit and a packet routing method capable of suppressing the power consumption based on the drawings in detail. Further, the packet routing apparatus, the interface circuit and the packet routing method disclosed in the present disclosure are not limited to the embodiments to be described below.

Figure 1:
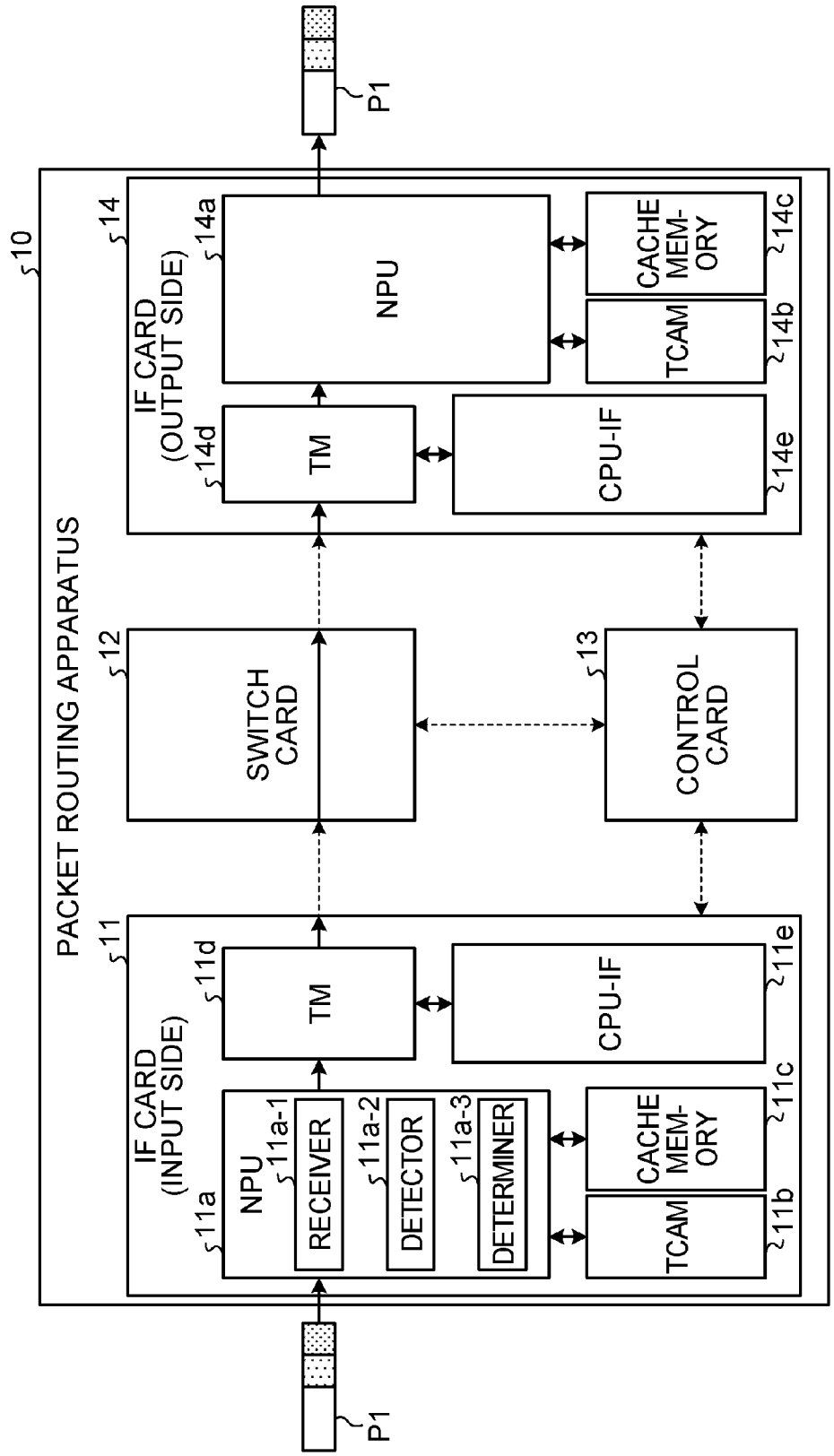
FIG. 1 is a block diagram illustrating a configuration of a packet routing apparatus.

First of all, a configuration of a packet routing apparatus according to an embodiment disclosed in the present disclosure will be described. FIG. 1 is a block diagram illustrating a configuration of a packet routing apparatus 10. The packet routing apparatus 10 is, for example, a layer 2 switch. As illustrated in FIG. 1, the packet routing apparatus 10 includes an input side IF (Interface) card 11, a switch card 12, a control card 13 and an output side IF card 14. These respective components are connected with each other in such a way that signal or data may be input and output in a unidirectional fashion or a bidirectional fashion. Further, in FIG. 1, an arrow represented by a solid line indicates a main signal and an arrow represented by a broken line indicates a signal flowing between the cards.

The IF card 11 is, for example, Ethernet (registered trademark) interface card (interface circuit) which includes a plurality of ports. The IF card 11 includes an NPU (Network Processing Unit) 11a, a TCAM 11b, a cache memory 11c, a TM (Traffic Manager) 11d and a CPU-IF (Central Processing Unit-Interface) 11e. These respective components are connected with each other in such a way that signal or data may be input and output in a unidirectional fashion or a bidirectional fashion.

The NPU 11a may be a DSP (Digital Signal Processing) circuit. For example, the NPU 11a determines whether the packet length of input packet P1 is greater than or equal to a predetermined value. When it is determined that the packet length is greater than or equal to the predetermined value, the NPU 11a performs routing of the packet P1 using the TCAM 11b and otherwise, when the packet length is less than the predetermined value, the NPU 11a performs routing of the packet P1 using the cache memory 11c. When the packet length of the packet P1 is less than the predetermined value and path information of the packet P1 is not stored in the cache memory 11c, the NPU 11a stores the path information in the cache memory 11c.

The NPU 11a includes a receiver 11a-1, a detector 11a-2 and a determiner 11a-3. The receiver 11a-1 receives the packet P1. The detector 11a-2 detects a packet length of the packet P1 received by the receiver 11a-1. The determiner 11a-3 determines whether the packet length detected by the detector 11a-2 is greater than or equal to the predetermined value. When it is determined that the packet length is greater than or equal to the predetermined value, the determiner 11a-3 performs routing of the packet P1 using the TCAM 11b and otherwise, when the packet length is less than the predetermined value, the determiner 11a-3 performs routing of the packet P1 using the cache memory 11c.

The TCAM 11b is a semiconductor chip capable of routing the packet at a higher speed compared to the cache memory 11c. Further, since the TCAM 11b deals with a large scale network (e.g., the Internet) having a large number of routes, the TCAM 11b is a larger capacity memory compared to the cache memory 11c, and may allow, for example, one entry to one hundred thousand entries. In the meantime, as the high-speed of packet communication is achieved, the power consumption of the IF card 11 tends to increase. Among devices constituting the IF card 11, since the TCAM 11b has an architecture in which electrical current is supplied and discharged to and from the entire region thereof for each memory retrieval (access), the TCAM 11b has a higher power consumption as compared to other device (e.g., the cache memory).

The TCAM 11b includes a MAC address table. The MAC address table stores respective information of, for example, MAC DA (Media Access Control Destination Address) and MAC SA (Media Access Control Source Address). The MAC address table stores an address for specifying path information as routing source information, in addition to the respective information. Since the respective information and the address are associated with each other to be stored, the TCAM 11b may specify the path information (e.g., destination card or destination port) of the packet through the address based on the header information (e.g., MAC DA, MAC SA) of the packet.

Further, the TCAM 11b includes a VLAN (Virtual Local Area Network) table. The VLAN table, for example, associates VLAN ID (VLAN Identification) with the address for specifying the path information to be stored as the routing source information. The TCAM 11b may specify the path information (e.g., destination port or table information priority) of the packet through the address based on the header information (e.g., VLAN ID) of the packet.

The cache memory 11c associates the destination card, the destination port and the table information priority with the address to be stored as the path information. The cache memory 11c has a smaller storage capacity compared to the TCAM 11b and may store and handle, for example, about one thousand entries.

The TM 11d performs high-speed queue provision, optimization of the number of queue items and scheduling in order to satisfy the QoS (Quality of Service) condition of an application program.

The CPU-IF 11e is an interface which connects a device such as the NPU 11a or the TM 11d with the control card 13 (e.g., CPU board).

The switch card 12 is an interconnect card which redirects the packet P1 from a port on the IF card 11 to another port on the IF card 14.

The control card 13 is, for example, a CPU board and controls integrally and comprehensively each card within the packet routing apparatus 10 by OS (Operating System).

The IF card 14 has the same configuration as that of the IF card 11 except that an input and output direction of the packet is different. Accordingly, reference numerals with the same end part may be used for the constitutional elements which are common between the IF card 14 and the IF card 11, and descriptions thereof will be omitted. Specifically, the NPU 14a, the TCAM 14b, the cache memory 14c, the TM 14d and the CPU-IF 14e correspond to the NPU 11a, the TCAM 11b, the cache memory 11c, TM 11d and the CPU-IF 11e, respectively.

Figure 2:
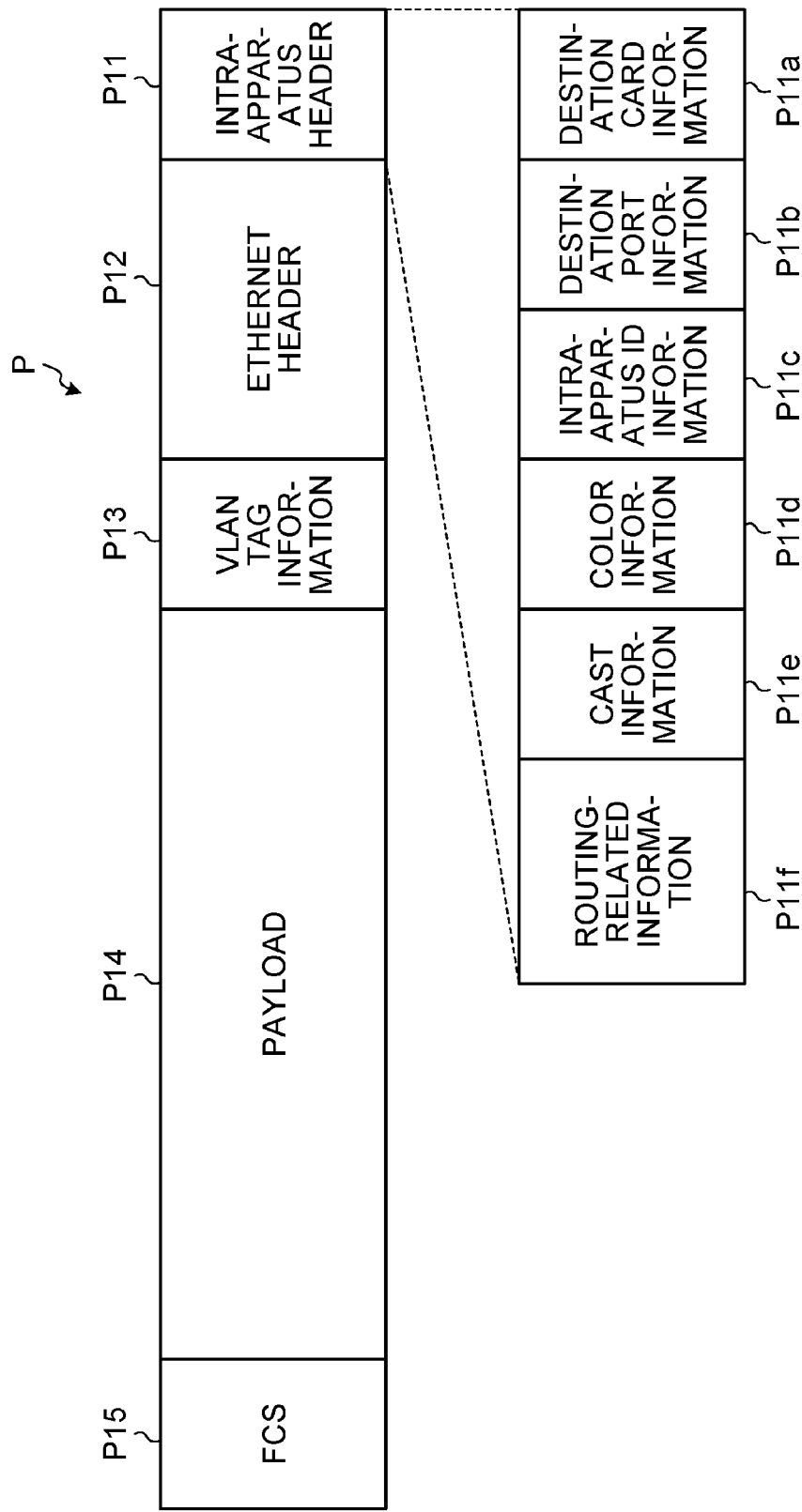
FIG. 2 is a view illustrating an example of a structure of a packet which becomes a target to be subjected to routing.

Next, descriptions will be made on a structure of a packet which becomes a target to be subjected to routing by the packet routing apparatus 10 with reference to FIG. 2. FIG. 2 is a view illustrating an example of a structure of packet P which becomes a target to be subjected to routing. As illustrated in FIG. 2, the packet P includes an intra-apparatus header P11, an Ethernet (registered trademark) header P12, a VLAN tag information P13, a payload P14 and an FCS (Frame Check Sequence) P15.

The intra-apparatus header P11 includes destination card information P11a, destination port information P11b, intra-apparatus ID information P11c, color information P11d, cast information P11e and routing-related information P11f. The destination card information P11a is identification information (e.g., "20"), which becomes a destination of the packet P, of a card and is used for routing as the path information of the packet P together with the destination port information P11b. The destination port information P11b is the identification information (e.g., "10", "m"), which becomes a destination of the packet P, of a port and is used for routing as the path information of the packet P together with the destination card information P11a. The intra-apparatus ID information P11c is identification information of a vendor which assigns, for example, the intra-apparatus header P11.

The color information P11d is information which indicates action (e.g., discard and transfer) to be applied to the packet P according to a type of service. For example, when the color information P11d of the packet P is marked in red at a certain service, the packet P becomes a target to be discarded. Further, when the color information P11d is marked in yellow, the packet P is transferred with the best effort fashion and when the color information P11d is marked in green, the packet P is transferred at a low drop probability.

The cast information P11e is information which identifies whether the destination of the packet P is plural (multicast or broadcast) or singular (unicast).

The routing-related information P11f is, for example, an ID of a queue used by the TM11d, forwarding information, padding information or mirroring information.

The Ethernet (registered trademark) header P12 is, for example, the MAC DA and the MAC SA used for specifying the path information of the packet P as the routing source information. The NPU 11a refers to the Ethernet (registered trademark) header P12 to acquire the path information (e.g., the destination card, the destination port) of the packet P from the TCAM 11b. Further, the NPU 11a refers to the Ethernet (registered trademark) header P12 to acquire the path information (e.g., destination card, destination port or table information priority) of the packet P from the cache memory 11c.

The VLAN tag information P13 is, for example, a VLAN ID used for specifying the path information of the packet P as the routing source information. The NPU 11a refers to the VLAN tag information P13 to acquire the path information (e.g., destination port or table information priority) of the packet P from the TCAM 11b. Further, the NPU 11a refers to the VLAN tag information P13 to acquire the path information (e.g., destination card, destination port or table information priority) of the packet P from the cache memory 11c.

The payload P14 is a data body except for the intra-apparatus header P11, the Ethernet (registered trademark) header P12, the VLAN tag information P13 and the FCS P15 among the data constituting the packet P.

The FCS P15 is a data for error detection added to examine whether the packet P has an error.

The operations will be described next.

Figure 3:
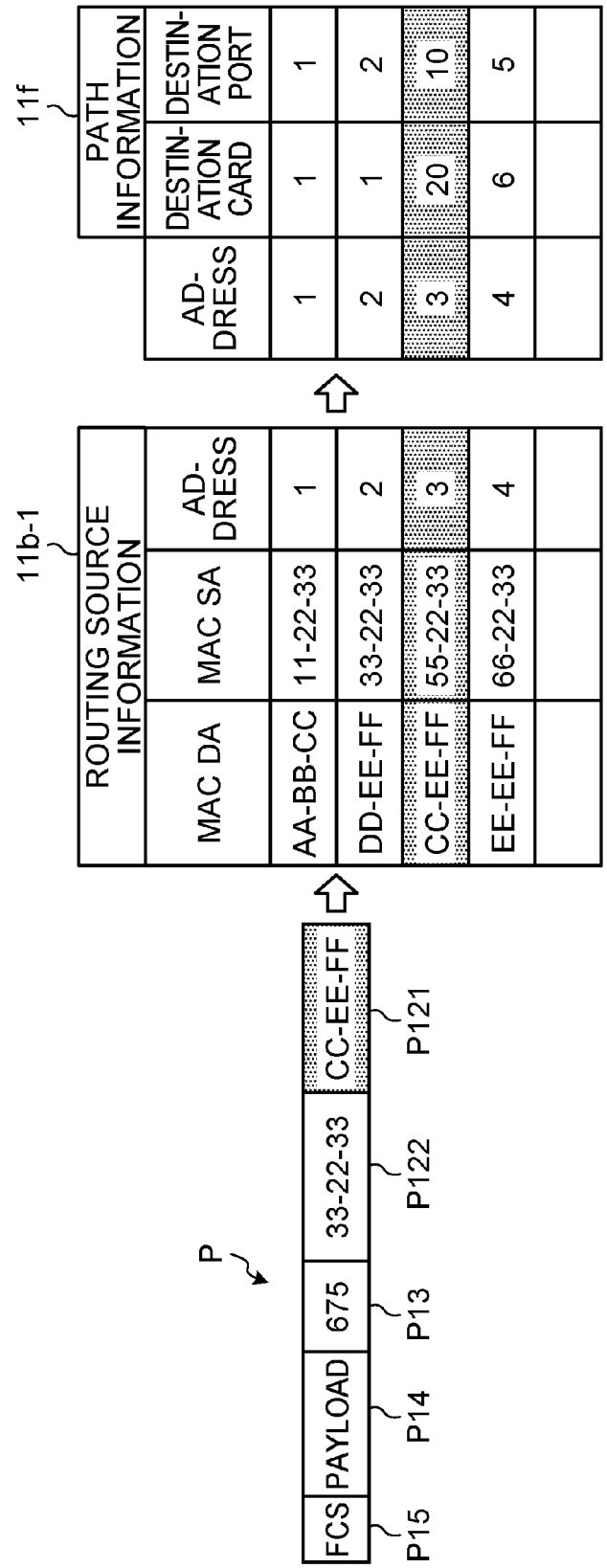
FIG. 3 is a view illustrating a situation in which path information of a packet is specified from a MAC address table of TCAM.

Description will be made on routing first using the TCAM 11b of the IF card 11. FIG. 3 is a view illustrating a situation in which the path information of a packet is specified from a MAC address table 11b-1 of the TCAM 11b. As illustrated in FIG. 3, the MAC DA and the MAC SA are associated with each other to be stored in the MAC address table 11b-1 of the TCAM 11b as the routing source information. Particularly, since the TCAM 11b has a mask function, a combinational retrieval, such as a retrieval using both the MAC DA and the MAC SA that match with each other, in addition to a retrieval using only the MAC DA and a retrieval using only the MAC SA from a single MAC address table, may be allowed. FIG. 3 illustrates an example in which the MAC SA is masked and only the MAC DA is retrieved.

As illustrated in FIG. 3, the packet P which is a target to be subjected to routing contains the MAC DA of "CC-EE-FF" in a header portion P121. Therefore, an address "3" which is in association with "CC-EE-FF" in the MAC address table 11b-1 of the TCAM 11b is output from the TCAM 11b. The NPU 11a of the IF card 11 specifies the path information of the packet P from an associative memory 11f (not illustrated in FIG. 1) based on the address "3". For example, in FIG. 3, a destination card "20" and a destination port "10" that are associated with the address "3" are specified in the associative memory 11f. Further, the associative memory 11f is a RAM, for example, a DRAM (Dynamic Random Access Memory) and a SRAM (Static Random Access Memory).

Figure 4:
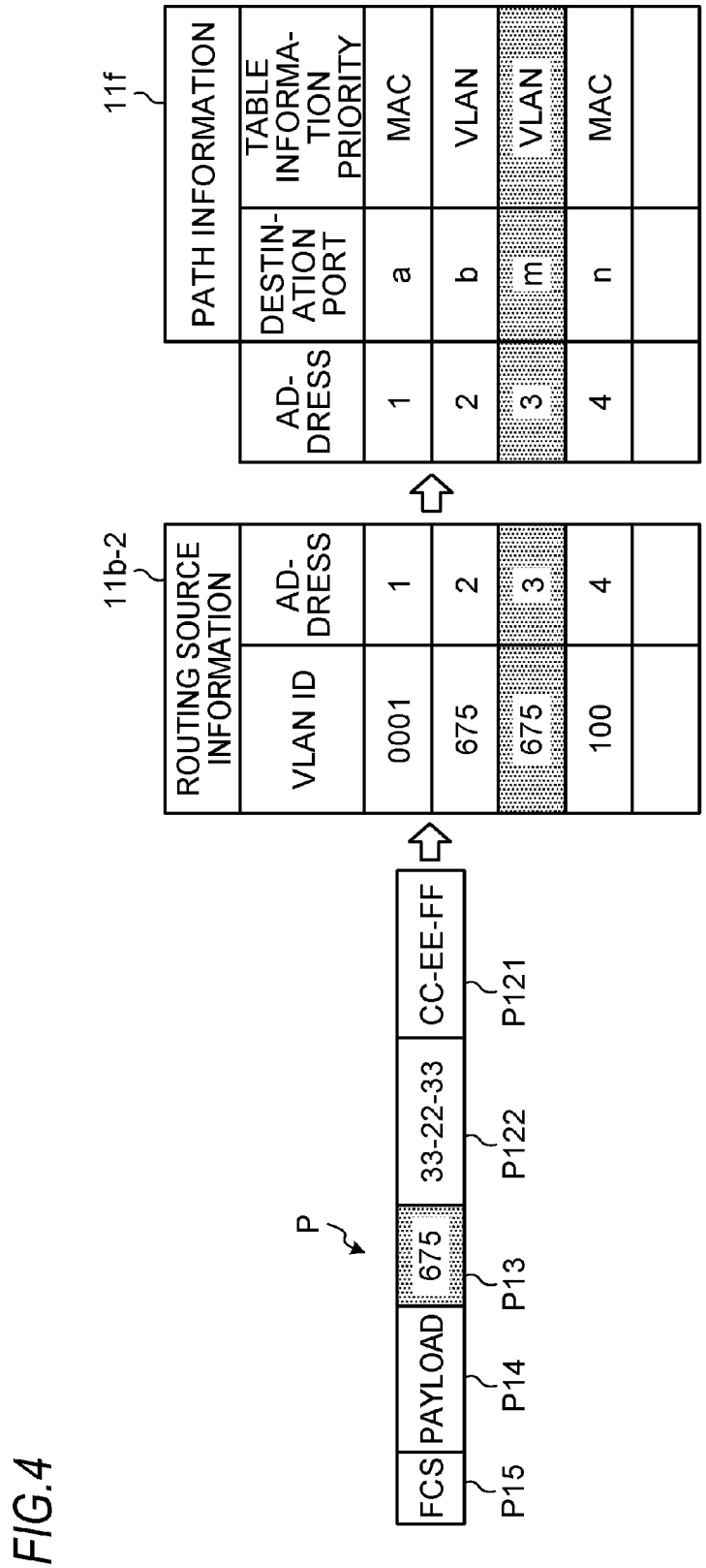
FIG. 4 is a view illustrating a situation in which path information of a packet is specified from a VLAN table of the TCAM.

Similarly, FIG. 4 is a view illustrating a situation in which the path information of a packet is specified from a VLAN table 11b-2 of the TCAM 11b. As illustrated in FIG. 4, a VLAN ID is stored in a VLAN table 11b-2 of the TCAM 11b as the routing source information. The packet P which is target to be subjected to routing contains a VLAN ID of "675" in the VLAN tag information P13. Therefore, the address "3" associated with the number "675" in the VLAN table 11b-2 of the TCAM 11b is output from the TCAM 11b. The NPU 11a of the IF card 11 specifies the path information of the packet P from the associative memory 11f based on the address "3". For example, in FIG. 4, a destination port "m" and a table information priority "VLAN" that are associated with the address "3" are specified in the associative memory 11f.

As described above, the destination card 20 is determined as the destination card of the packet P. Further, regarding the destination port, since the table information priority is "VLAN", the destination port m specified by the VLAN table 11b-2 has a priority over the destination port 10 specified by the MAC address table 11b-1. As a result, the destination port m is determined as the destination port of the packet P. That is, the NPU 11a of the IF card 11 determines the destination port m of the destination card 20 as a path of the packet P based on the respective path information.

Further, since a combination of the MAC address and the VLAN ID is determined by a combination of types of information of the MAC address table and the VLAN table, the number of combination becomes enormous. Therefore, the TCAM 11b of the IF card 11 independently includes the MAC address table 11b-1 and VLAN table 11b-2 to individually retrieve the information within each table. Accordingly, the combination of the MAC address and the VLAN ID is determined by the information specified according to each of the MAC address table and the VLAN table. Accordingly, the packet routing apparatus 10 may greatly suppress required resources of the TCAM 11b for which multiple accesses are expected during a forwarding process.

Figure 5:
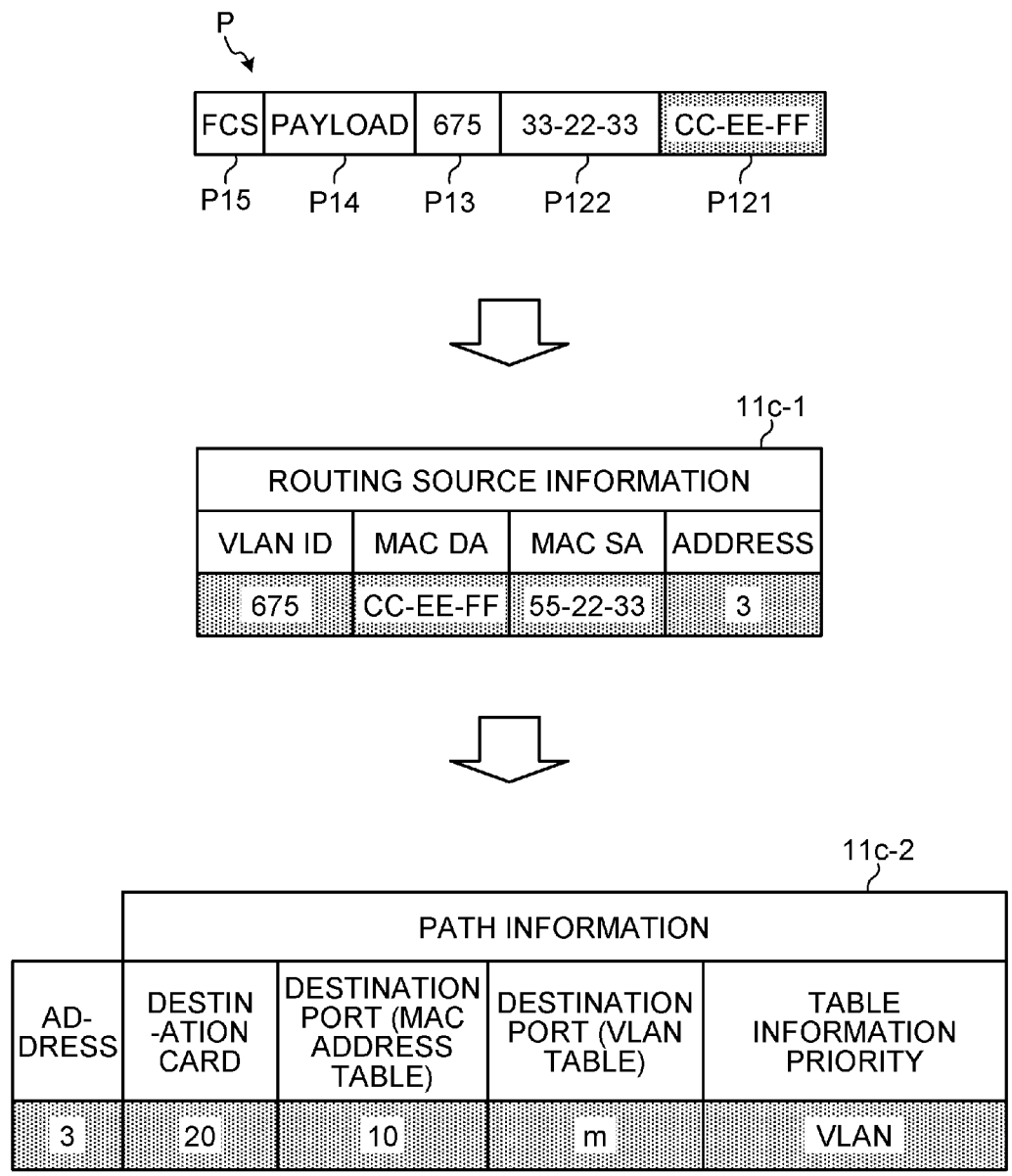
FIG. 5 is a view illustrating a situation in which path information of a packet is specified from a cache memory.

Next, descriptions will be made on routing executed when a packet having a packet length shorter than a predetermined value is received, that is, when routing using by the cache memory 11c of the IF card 11. FIG. 5 is a view illustrating a situation in which the path information of the packet P is specified from the cache memory 11c. As illustrated in FIG. 5, the cache memory 11c stores the VLAN ID, the MAC DA, the MAC SA and the address to be associated with each other as the routing source information 11c-1. Further, the cache memory 11c stores the address, the destination card, the destination port within the MAC address table 11b-1 (see FIG. 3), the destination port within the VLAN table 11b-2 (see FIG. 4) and the table information priority to be associated with each other as the path information 11c-2.

As described above, since the amount of path information formed by combining the MAC address and the VLAN ID becomes enormous, the path information is stored in the TCAM 11b in a situation where the resources required to be used are being suppressed. In contrast, differently from the TCAM 11b (see, e.g., FIG. 3 and FIG. 4), the cache memory 11c simply needs to store some of the path information using the cache memory 11c among all the path information stored in the associative memory 11f. Therefore, as illustrated in FIG. 5, the cache memory 11c may store all the information (the destination card, the destination port, the table information priority) included in the path information as the information for a single entry. In other words, the cache memory 11c may store the path information as a set from the start without dividing the table. Accordingly, the NPU 11a of the IF card 11 may acquire all (e.g., "20", "10", "m" and "VLAN") of the path information associated with the packet P based on a single address (e.g., "3") specified from the packet P and the routing source information.

Figure 6:
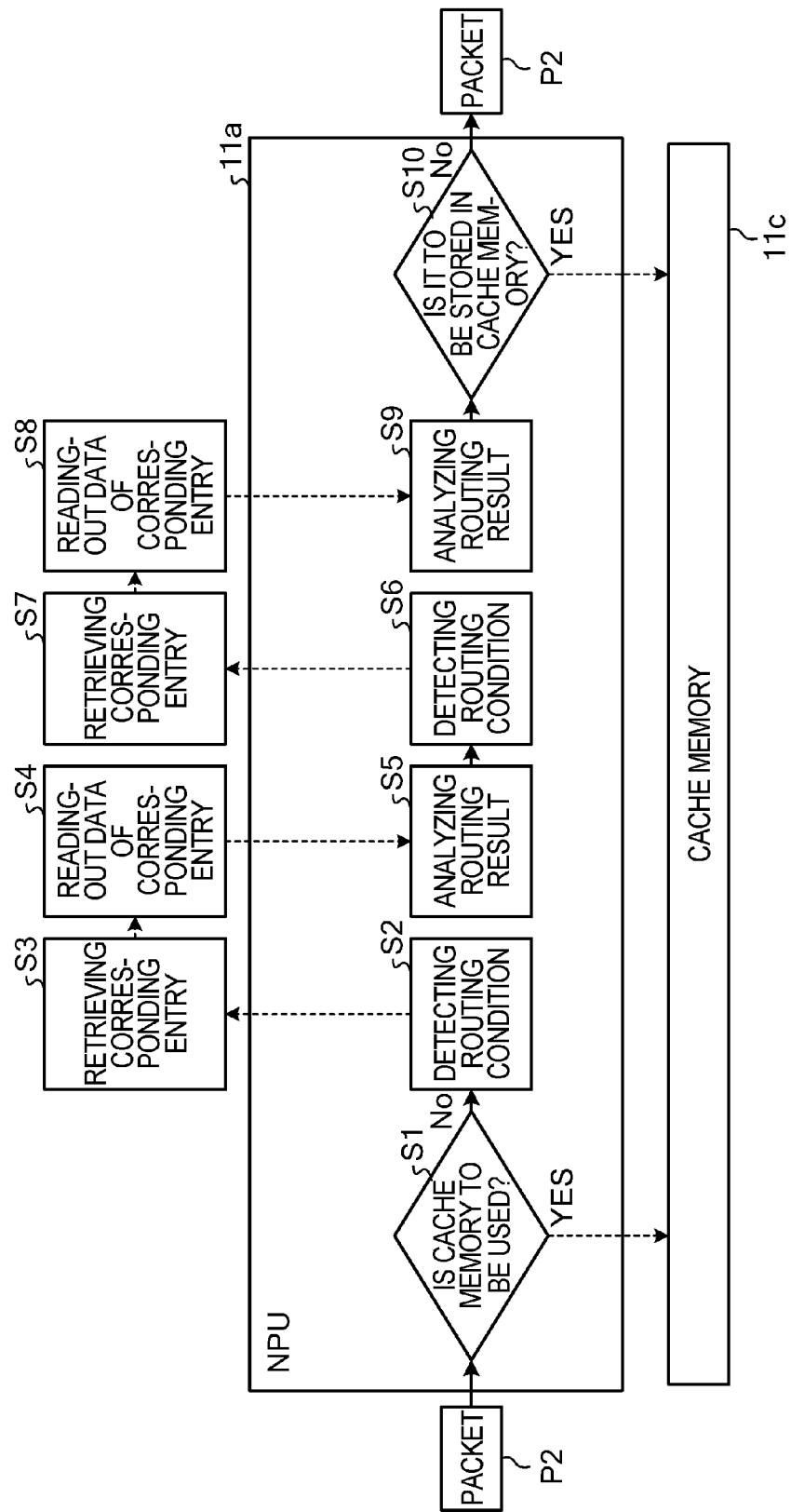
FIG. 6 is a view for explaining respective processings of a use determination and a storage determination of a cache memory executed by an NPU.

Next, descriptions will be made on a use determination and a storage determination of the cache memory 11c with reference to FIG. 6. The process illustrated in FIG. 6 is executed by the NPU 11a, and FIG. 6 is a view for explaining processings of the use determination and a storage determination of the cache memory 11c. Further, in FIG. 6, an arrow represented by the solid line illustrates main signal processings and an arrow represented by the broken line illustrates memory access processings.

As illustrated in FIG. 6, at operation S1, the NPU 11a of the IF card 11 determines whether the cache memory 11c is to be used prior to the routing of the input packet P2. The determination is performed based on, for example, whether the packet length of the packet P2 is greater than or equal to the predetermined value. When the packet length is greater than or equal to the predetermined value, it is determined that the TCAM 11b is to be used ("NO" at operation S1) and the process proceeds to operation S2. In the meantime, when the packet length is less than the predetermined value, it is determined that the cache memory 11c is to be used ("YES" at operation S1). When it is determined that the cache memory 11c is to be used, the routing that uses the TCAM 11b is not performed.

Further, the predetermined value is, for example, about 50 bytes to 300 bytes (e.g., 100 bytes), but may be appropriately changed according to an amount of packet traffic or a capacity of the cache memory 11c. Further, the predetermined value may be a value which is set by a user or stored in the packet routing apparatus 10 in advance.

At operation S2, the NPU 11a detects a routing condition (e.g., MAC DA, MAC SA) from the packet P2. Subsequently, the TCAM 11b retrieves an entry corresponding to the routing condition detected at operation S2 from the MAC address table 11b-1 (operation S3). As a result of the detection, as illustrated in FIG. 3, for example, the address "3" associated with "CC-EE-FF" of MAC DA is acquired. At operation S4, the NPU 11a reads-out data (e.g., the destination card "20", the destination port "10") of the entry associated with the address acquired at operation S3 from the associative memory 11f. The read-out data is used in analysis of a routing result in the NPU 11a (operation S5).

A series of processings of operations of S2 to S5 are executed similarly with respect to the VLAN ID. Subsequently, the NPU 11a detects the routing condition (e.g., VLAN ID) from the packet P2. The TCAM 11b then retrieves an entry corresponding to the routing condition detected at operation S6 from the VLAN table 11b-2 (operation S7). As a result of the detection, as illustrated in FIG. 4, for example, the address "3" associated with "675" of VLAN ID is acquired. At operation S8, the NPU 11a reads-out data (e.g., destination port "m" and the table information priority "VLAN") of the entry associated with the address acquired at operation S7 from the associative memory 11f. The read-out data is used in analysis of the routing result in the NPU 11a (operation S9).

At operation S10, the NPU 11a determines whether the path information of the packet P2 is to be stored (enter to cache memory) in the cache memory 11c as a preparation processing for a case where a packet having the same destination as that of the packet P2 is received again. The determination is performed based on whether the path information is already stored in the cache memory 11c as an entry. Even though it has been determined that the cache memory 11c is to be used at operation S1, when it is determined that the path information is not stored in the cache memory 11c as an entry ("YES" at operation S10), the NPU 11a acquires the path information of the packet P2 from the associative memory 11f to store the path information in the cache memory 11c. In the meantime, when it is determined that the path information is already stored in the cache memory 11c as an entry ("NO" at operation S10), the NPU 11a outputs the packet P2 to the outside without storing the path information of the packet P2 in the cache memory 11c.

Next, description will be made on a process of determining whether the cache memory 11c is to be used in the embodiment.

Figure 7:
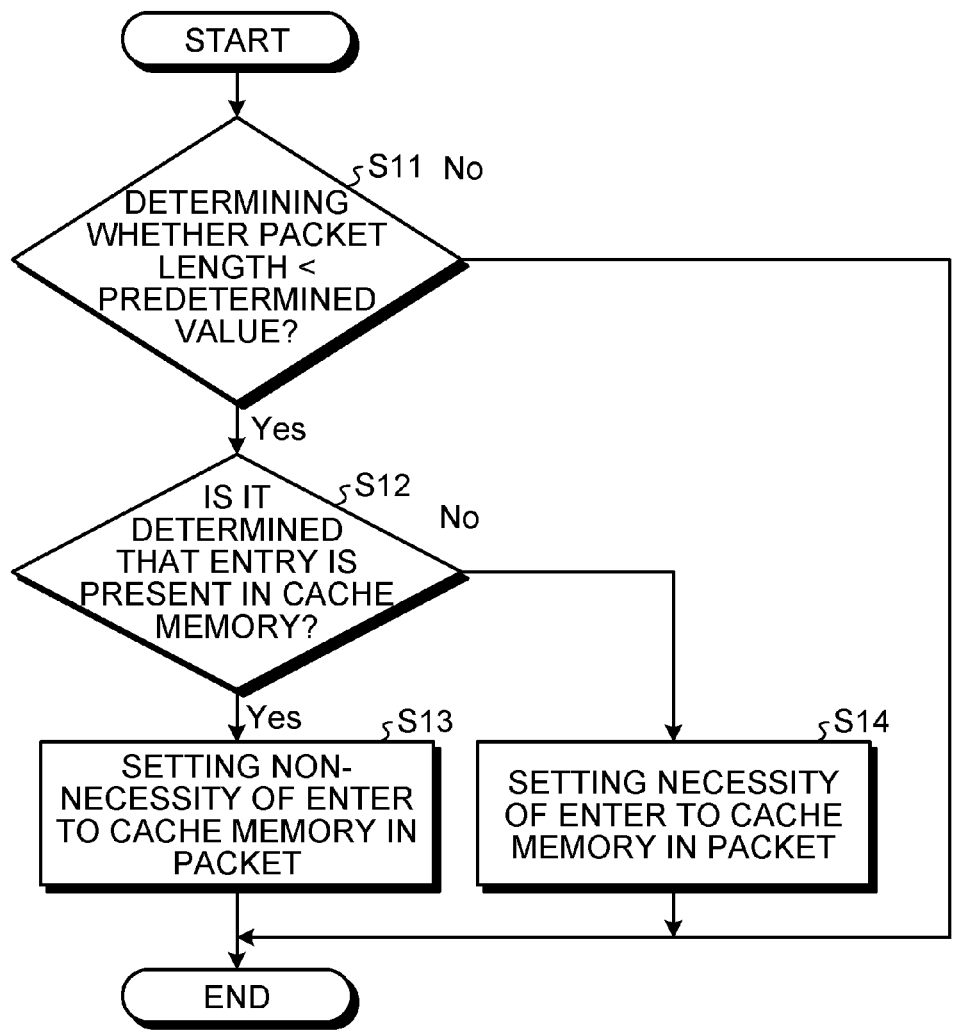
FIG. 7 is a flowchart for explaining a process of determining whether the cache memory is to be used when acquiring path information in an embodiment of the present disclosure.

FIG. 7 is a flowchart for explaining a process of determining whether the cache memory is to be used when acquiring the path information in the present embodiment. At operation S11, when a packet is input, the NPU 11a compares the packet length of the packet with a predetermined value. As a result of the comparison, since the packet having the packet length less than the predetermined value becomes a target to be subjected to routing using the cache memory 11c, it is determined that the packet is required to be set as necessity of enter to cache memory ("YES" at operation S11). In contrast, since the packet having the packet length greater than or equal to the predetermined value becomes a target to be subjected to routing using the TCAM 11b, it is determined that the packet is required to be set as non-necessity of enter to cache memory ("NO" at operation S11).

Further, the packet length of the input packet may be measured by the NPU 11a and the information stored in, for example, a header may be used for the packet length.

At operation S11, when it is determined that the packet length of the packet is less than ("YES" at operation S11), the NPU 11a determines whether the path information of the packet having the packet length less than the predetermined value is stored (entry) in the cache memory 11c (operation S12). When it is determined that the path information is stored ("YES" at operation S12), the NPU 11a sets a "non-necessity" in an area of necessity information of enter to cache memory of the packet which will be described later (operation S13). After setting the "non-necessity", the NPU 11a performs the routing of the packet using the cache memory 11c to acquire the path information stored in the cache memory 11c.

When it is determined at operation S12 that the path information is not stored in the cache memory 11c ("NO" at operation S12), the NPU 11a sets a "necessity" in an area of necessity information of enter to cache memory of the packet (operation S14). After setting the "necessity", the NPU 11a retrieves the path of the packet using the TCAM 11b to acquire the path information stored in the associative memory 11f.

Further, since the TCAM 11b may be used when it is determined at operation S11 that the packet length of the packet is greater than or equal to the predetermined value ("NO" at operation S11), the NPU 11a S14 acquires the path information stored in the associative memory 11f without performing respective processings of operation S12 to operation S14.

Figure 8:
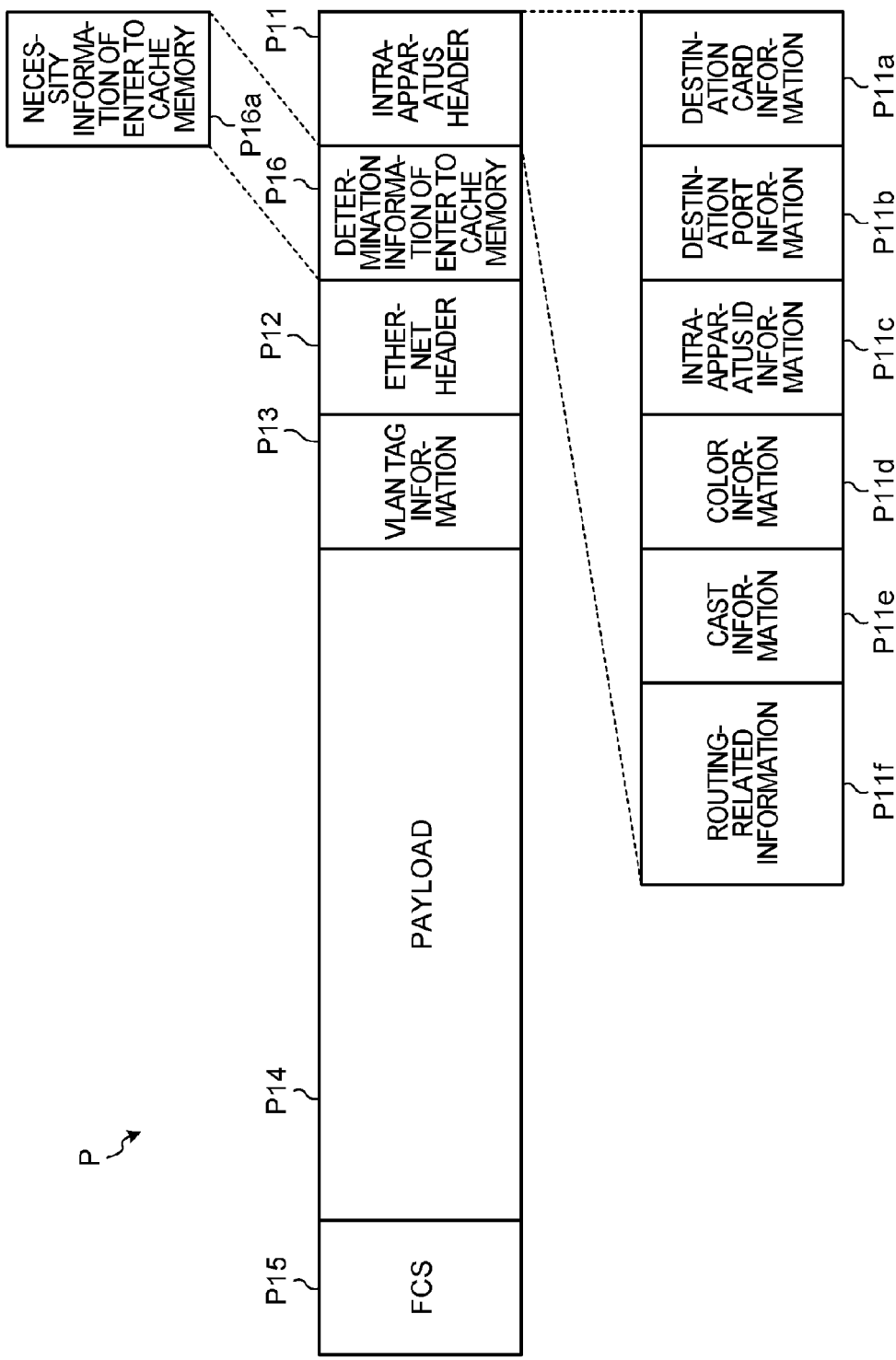
FIG. 8 is a view illustrating an example of a structure of a packet in which necessity information of enter to cache memory is assigned.

FIG. 8 is a view illustrating an example of a structure of a packet P in which the necessity information of enter to cache memory P16a is assigned. In FIG. 8, in the packet P, an area which stores a determination information of enter to cache memory P16 is provided between the intra-apparatus header P11 and the Ethernet (registered trademark) header P12, and the necessity information of enter to cache memory P16a is set in the area. Specifically, at operation of S13 FIG. 7, "non-necessity" is set in the area of the necessity information of enter to cache memory P16a and at operation of S14 FIG. 7, "necessity" is set in the area of the necessity information of enter to cache memory P16a. As a result, the packet P which is initially in a state of being illustrated in FIG. 2 is updated to a state of being illustrated in FIG. 8. Accordingly, the NPU 11a of the IF card 11 may refer to the necessity information of enter to cache memory P16a to determine whether the path information of the packet P is to be stored (entry) in the cache memory 11c.

Figure 9:
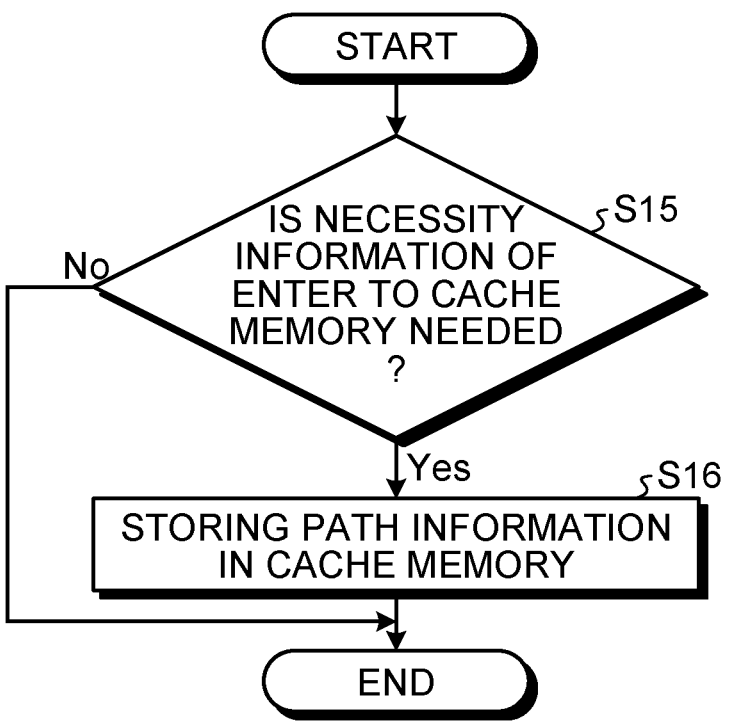
FIG. 9 is a flowchart for explaining a process of determining whether path information is to be stored in the cache memory.

Next, descriptions will be made on a process of determining whether the path information is to be stored in the cache memory 11c in the embodiment. FIG. 9 is a flowchart for explaining a process of determining whether the path information is to be stored in the cache memory 11c. At operation S15, the NPU 11a of the packet routing apparatus 10 refers to the necessity information of enter to cache memory P16a of the input packet (see, e.g., FIG. 8) to determine whether the input packet is to be stored as a cache entry. As a result of the determination, when it is determined that "necessity" is set in the area of the necessity information of enter to cache memory P16a ("YES" at operation S15), the path information of the packet is in a state of being non-entry in spite of being needed to be stored in the cache memory 11c. Accordingly, when a packet having the same destination as that of the packet is re-input, the NPU 11a stores the path information in the cache memory 11c so that the routing using the cache memory 11c may be performed (operation S16). That is, the NPU 11a acquires the path information of the packet from the associative memory 11f via the TCAM 11b and stores the path information in the cache memory 11c.

In the meantime, when it is determined at operation S15 that "non-necessity" is set in the area of the necessity information of enter to cache memory P16a ("NO" at operation S15), the path information of the packet is already in a state of being entry in the cache memory 11c, so that the NPU 11a ends the storage determination process. Since the packet routing apparatus 10 does not store the path information when the path information has already been entered into the cache memory, a redundant entry of the same path information is avoided, so that the cache memory 11c having a limitation on a storage capacity may be efficiently used.

As described above, the packet routing apparatus 10 includes a plurality of IF cards 11 and 14, and the switch card 12. The plurality of IF cards 11 and 14 include the plurality of ports which transmit and receive the packet P1 to and from the outside, respectively. The switch card 12 transfers the packet P1 received from one port to another port according to a destination address. The IF card 11 includes the TCAM 11b, the cache memory 11c and the NPU 11a. The TCAM 11b stores the plurality of routing information used in the routing of the packet P1. The cache memory 11c stores a number of the routing information which is less than those of the TCAM 11b. The NPU 11a detects the packet length of the packet P1 received from the outside and performs the routing of the packet P using the cache memory 11c when the detected packet length is less than the predetermined value.

Specifically, the packet routing apparatus 10 includes the TCAM 11b, the cache memory 11c and the NPU 11a. The TCAM 11b is a retrieval memory used in the routing of the packet P. The cache memory 11c is a cache memory that has the power consumption, which is lower than that of the TCAM 11b when performing the routing of the packet P. The NPU 11a determines whether the packet length is greater than or equal to the predetermined value and performs the routing of the packet P using the TCAM 11b when the packet length is greater than or equal to the predetermined value and otherwise, performs the routing of the packet P using the cache memory 11c when the packet length is less than the predetermined value. In other words, the packet routing apparatus 10 uses the cache memory 11c instead of the TCAM 11b to deal with a counteraction for a packet (packet routing), which acts as a high load in terms of the TCAM 11b, having a short packet length.

In the packet communication, in a case where the packet length is short even when the amount of traffic is constant, since the number of packets per unit time increases, an access rate from the NPU 11a to the TCAM 11b increases. Therefore, as described above, the packet routing apparatus 10 according to the embodiment uses the TCAM 11b and the cache memory 11c separately according to the length of the packet. Specifically, when the packet length of the received packet is a shorter one, the packet routing apparatus 10 performs the routing of the packet using the cache memory 11c having, for example, the power consumption lower than that of the TCAM 11b. Accordingly, even when the packets having the short packet length and the same destination are received intensively for a short time in the packet routing apparatus 10, an increase of the access frequency to the TCAM 11b is avoided. Accordingly, the power consumption of the TCAM 11b is suppressed. As a result, an increase of temperature of the TCAM 11b may be suppressed as well.

In the present embodiment, since the number of routing information, which is a target to be subjected to routing stored in the cache memory 11c (second memory) is smaller than that of the TCAM (first memory), the power consumption caused by a single routing using the cache memory (second memory) is lower as compared to that of the TCAM (first memory). As a result, since the packet routing apparatus 10 performs the routing of the packets which are frequently arrived by using the cache memory (second memory), the power consumption in the routing process is suppressed. In the embodiment, particularly, in order to suppress the power consumption for a case where the packets having a short packet length are successively received, the packet routing apparatus 10 performs the routing of the packet having the short packet length by using the cache memory (second memory) in which the routing information is stored in a manner as described above. Accordingly, the packet routing apparatus 10 suppresses the power consumption in the routing process. Further, a device having a lower power consumption due to a small amount of data capable of being stored therein may be employed as the cache memory (second memory).

Modified Example 1

Next, descriptions will be made on Modified Example 1. The difference between Modified Example 1 and the embodiment described above is a determination criteria as to whether the cache memory is to be used in the routing process. Specifically, in the embodiment described above, the packet routing apparatus 10 determines whether the cache memory 11c is required to be used based on the packet length of the input packet. In contrast, in Modified Example 1, the packet routing apparatus 10 determines as to whether the cache memory 11c is required to be used based on whether priority of enter to cache memory for the input packet is set or not. The packet routing apparatus 10 determines whether the cache memory 11c is required to be used based on the packet length of the input packet. Hereinafter, descriptions will be made based mainly on a difference between Modified Example 1 and the embodiment.

Figure 10:
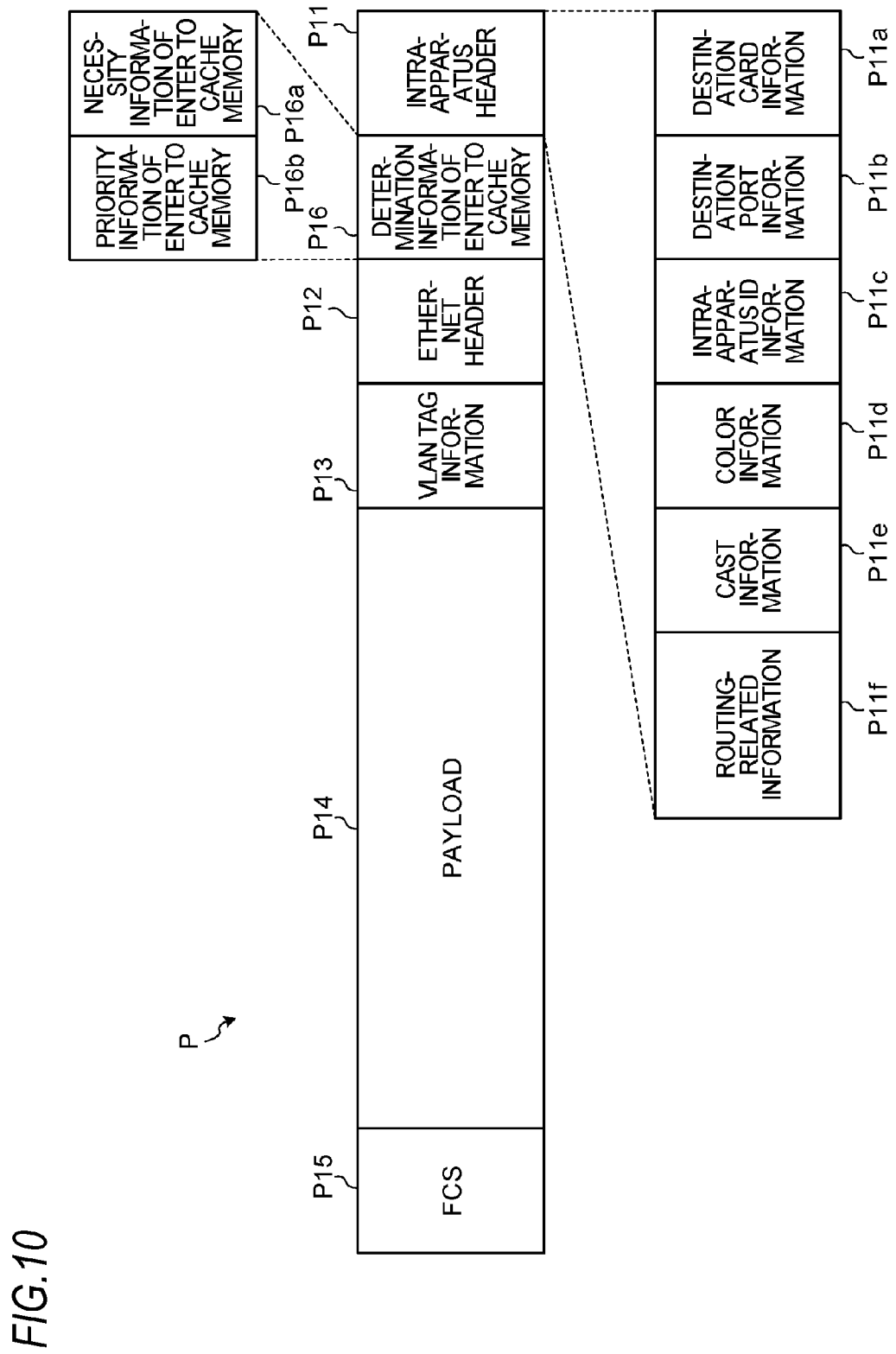
FIG. 10 is a view illustrating an example of a structure of packet P in Modified Example 1.

The packet routing apparatus according to Modified Example 1 has the same configuration as that of the packet routing apparatus 10 according to the embodiment illustrated in FIG. 1. Accordingly, in Modified Example 1, the same reference numerals are used for the constitutional elements which are common between the embodiment and Modified Example 1, and illustration and descriptions thereof will be omitted. FIG. 10 is a view illustrating an example of a structure of the packet P in Modified example 1. As illustrated in FIG. 10, the packet P in Modified Example 1 has the same structure as that of the packet P illustrated in FIG. 8 except that priority information of enter to cache memory P16b is included in the determination information of enter to cache memory P16. Accordingly, the same reference numerals are used for the constitutional elements which are common between FIG. 8 and FIG. 10, and detailed descriptions thereof will be omitted.

The priority information of enter to cache memory P16b is used for determining whether the cache memory 11c is preferentially used over the TCAM 11b at the time of routing the packet P. For example, when the number "1" is set in the priority information of enter to cache memory P16b, the path information of the packet P is acquired from the cache memory 11c. In the meantime, when the number "0" is set in the priority information of enter to cache memory P16b, the path information of the packet P is acquired from the associative memory 11f (see FIG. 3) through the TCAM 11b.

Figure 11:
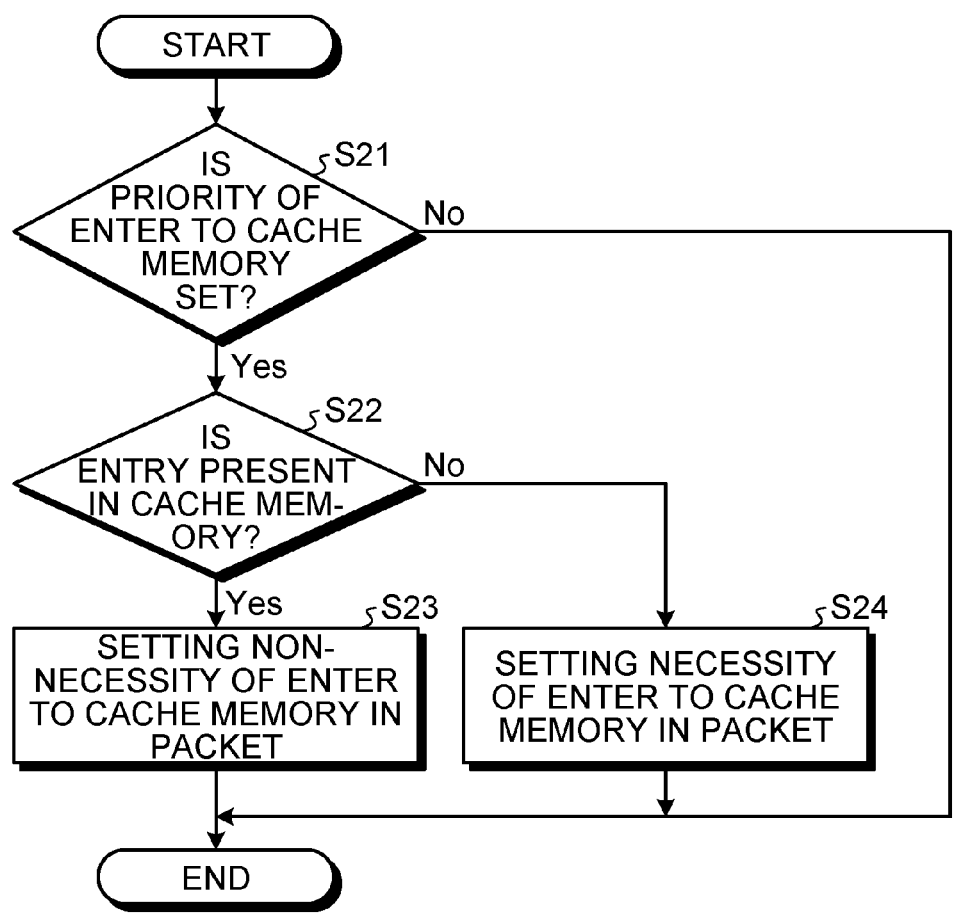
FIG. 11 is a flowchart for explaining a process of determining whether the cache memory is to be used when acquiring path information in Modified Example 1.

Next, the operations of the packet routing apparatus 10 in Modified Example 1 will be described based mainly on the difference between Modified Example 1 and the embodiment. FIG. 11 is a flowchart for explaining a process of determining whether the cache memory 11c is required to be used when acquiring the path information in Modified example 1. Since the process of FIG. 11 includes the same processings as those of FIG. 7 which are referenced in explaining the operations according to the embodiment, the operations which are common between the processes of FIG. 7 and FIG. 11 are assigned the reference numerals of which end portions are the same with each other, and detailed descriptions thereof will be omitted. Specifically, respective processings of the operations S22 to S24 of FIG. 11 correspond to those of the operations S12 to S14 of FIG. 7.

At operation S21 which is unique to Modified Example 1, when the packet P is input, the NPU 11a of the packet routing apparatus 10 refers to the priority information of enter to cache memory P16b of the packet P (see FIG. 10) to determine whether the priority of enter to cache memory is set or not. For example, when the number "1" is set as the priority information of enter to cache memory P16b, the NPU 11a determines that the priority of enter to cache memory is set and otherwise, when the number "0" is set as the priority information of enter to cache memory P16b, the NPU 11a determines that the priority of enter to cache memory P16b is not set.

As a result of the determination, since a packet for which the priority of enter to cache memory is set as "presence" becomes a target to be subjected to routing using the cache memory 11c, it is determined that the packet is required to be set as the necessity of enter to cache memory ("YES" at operation S21). In contrast, since a packet for which the priority of enter to cache memory is set as "absence" becomes a target to be subjected to routing using the TCAM 11b, it is determined that the packet is required to be set as the non-necessity of enter to cache memory ("NO" at operation S21).

Further, a priority for the priority information of enter to cache memory P16b may be set by, for example, a transmission source node of the packet P or a user of the packet routing apparatus 10 and otherwise, the priority may be automatically set by the packet routing apparatus 10 based on the reception frequency or the reception timing intervals of the packet P. Further, regarding a determination criteria as to whether the priority of enter to cache memory is set or not, the packet routing apparatus 10 may use, for example, the number of times that the packet P is received during a predetermined period of time or a reception timing interval at which the packet P is received. For example, when the number of reception times is used, the packet routing apparatus 10 sets the priority of enter to cache memory as "presence" for the packet P which has been received multiple times (e.g., received ten times or more for one hour). Further, when the reception timing interval is used, the packet routing apparatus 10 sets the priority of enter to cache memory as the "presence" for the packet P which has been received predetermined times or more (e.g., 5 times) at shorter timing intervals (e.g., 10 minutes or less).

As described above, the NPU 11a of the packet routing apparatus 10 determines whether a setting to preferentially use the cache memory 11c for the routing of the packet P is present in the packet P. When it is determined that the setting described above is not present in the packet P, the NPU 11a performs the routing of the packet P using the TCAM 11b and otherwise, when the setting described above is not present in the packet P, the NPU 11a performs the routing of the packet P using the cache memory 11c. According to the packet routing apparatus 10 of Modified Example 1, the NPU 11a preferentially performs the routing of the packet which is regularly received using the cache memory 11c or which the reception is expected based on whether the setting is present or not. Accordingly, since the opportunity that the cache memory 11c is preferentially used increases, the load of the TCAM 11b according to the routing is reduced. As a result, the power consumption of the TCAM 11b is suppressed.

Modified Example 2

Figure 12:
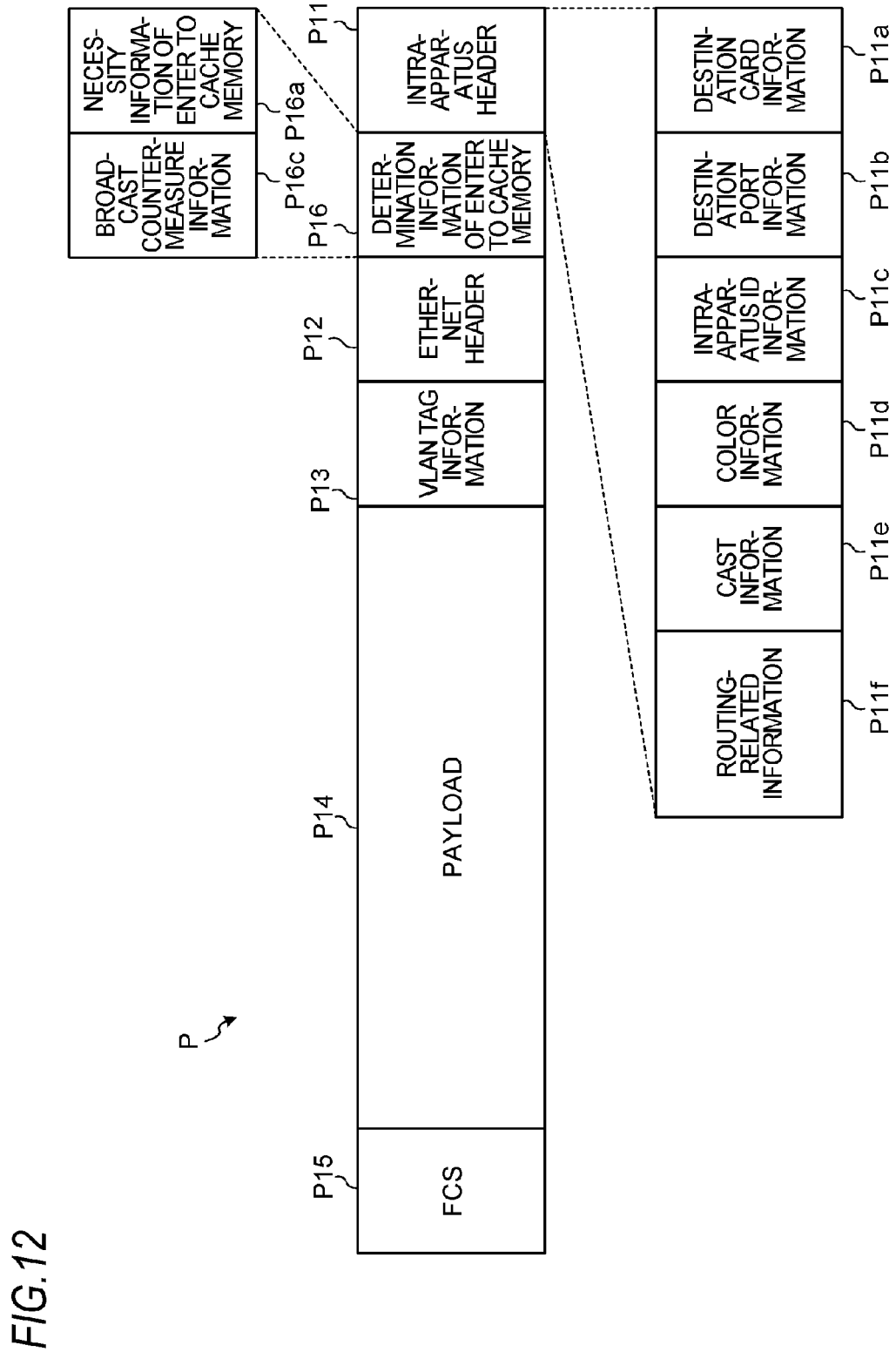
FIG. 12 is a view illustrating an example of a structure of packet P in Modified Example 2.

Next, descriptions will be made on Modified Example 2. The difference between Modified Example 2 and the embodiment described above is the determination criteria as to whether the cache memory is to be used in the routing process. Specifically, in the embodiment described above, the packet routing apparatus 10 determines whether the cache memory 11c is needed to be used based on the length of the input packet. In contrast, in Modified Example 2, the packet routing apparatus 10 determines as to whether the cache memory 11c is required to be used based on whether the input packet is a broadcast packet or not. Hereinafter, descriptions will be made based mainly on a difference between Modified Example 2 and the embodiment The packet routing apparatus according to Modified Example 2 has the same configuration as that of the packet routing apparatus 10 according to the embodiment illustrated in FIG. 1. Accordingly, in Modified Example 2, the same reference numerals are used for the constitutional elements which are common between the embodiment described above and Modified Example 2, and illustration and descriptions thereof will be omitted. FIG. 12 is a view illustrating an example of a structure of packet P in Modified Example 2. As illustrated in FIG. 12, the packet P in Modified Example 2 has the same structure as that of the packet P illustrated in FIG. 8 except that broadcast countermeasure information P16c is included in the determination information of enter to cache memory P16. Accordingly, the same reference numerals are used for the constitutional elements which are common between FIG. 8 and FIG. 12, and detailed descriptions thereof will be omitted.

The broadcast countermeasure information P16c is used for determining which of the TCAM 11b and the cache memory 11c is to be used as a memory for the routing of the packet P in a case where the input packet P is a broadcast packet. For example, when the number "1" is set in the broadcast countermeasure information P16c, the path information of the packet P is acquired from the cache memory 11c. In the meantime, when the number "0" is set in the broadcast countermeasure information P16c, the path information of the packet P is acquired from the associative memory 11f through the TCAM 11b.

Figure 13:
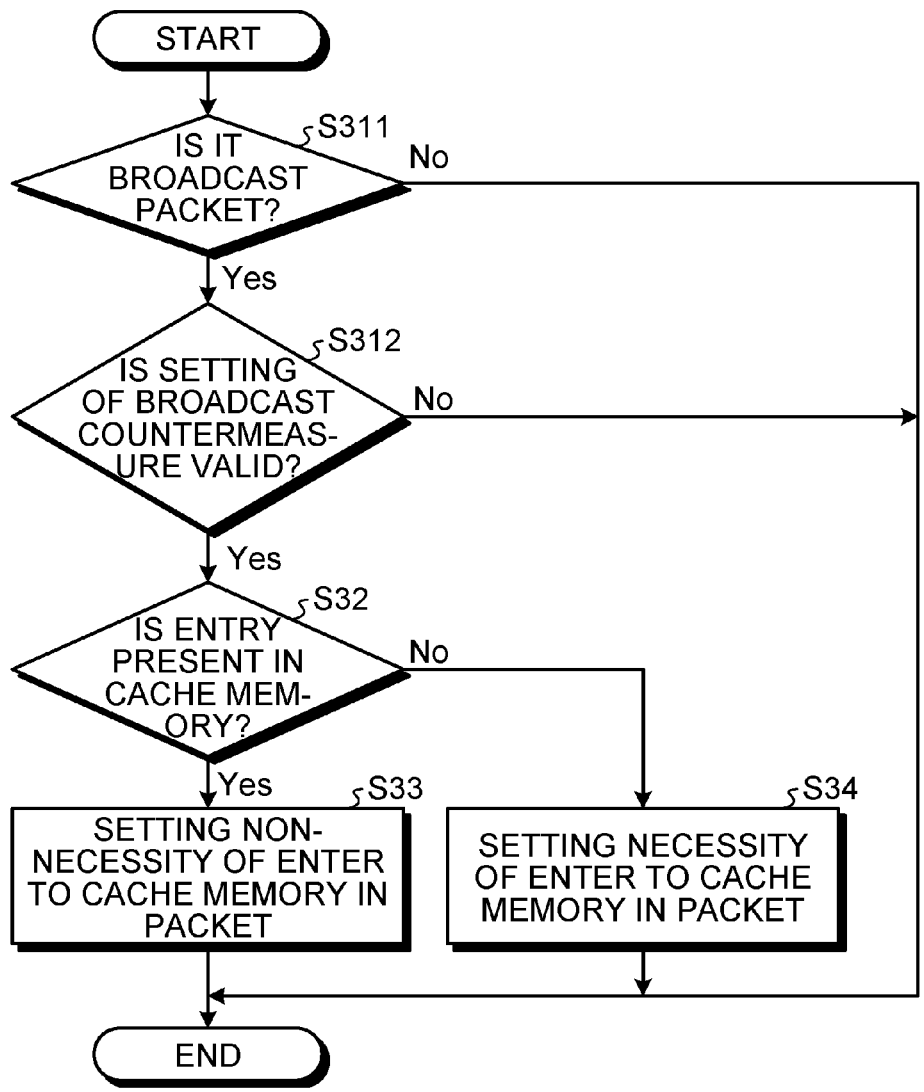
FIG. 13 is a flowchart for explaining a process of determining whether the cache memory is to be used when acquiring path information in Modified Example 2.

Next, the operations of the packet routing apparatus 10 in Modified Example 2 will be described based mainly on the difference between Modified Example 1 and the embodiment. FIG. 13 is a flowchart for explaining a process of determining whether the cache memory 11c is required to be used when acquiring the path information in Modified Example 2. Since the process of FIG. 13 includes the same processings as those of FIG. 7 which are referenced in explaining the operations according to the embodiment, the operations which are common between the processes of FIG. 7 and FIG. 13 are assigned as the reference numerals of which end portions are the same with each other, and detailed descriptions thereof will be omitted. Specifically, respective processings of the operations S32 to S34 of FIG. 13 correspond to those of the operations S12 to S14 of FIG. 7.

At operation S31 which is unique to Modified Example 2, when the packet P is input, the NPU 11a of the packet routing apparatus 10 refers to the Ethernet (registered trademark) header P12 of the packet P (see, e.g., FIG. 12) to determine whether the packet P is a broadcast packet. The determination is performed based on whether all the destination cards and all the destination ports are set in, for example, a MAC DA of the Ethernet (registered trademark) header P12. When all the destination card and all the destination port are set in the MAC DA, it is determined that the packet P is the broadcast packet and otherwise, when a card or a port which is not set as a destination is present, it is determined that the packet P is not the broadcast packet.

In Modified Example 2, when it is determined that the packet P is the broadcast packet ("YES" at operation S311), the process proceeds to operation S312, and otherwise, when the packet P is not the broadcast packet ("NO" at operation S311), the processings after operation S311 are omitted and the process is ended.

At operation S312, the NPU 11a of the packet routing apparatus 10 refers to the broadcast countermeasure information P16c of the packet P (see, e.g., FIG. 12) to confirm whether the setting of the broadcast countermeasure is established within the packet routing apparatus 10. For example, when the number "1" is set as the broadcast countermeasure information P16c, the NPU 11a determines that the broadcast countermeasure is valid and otherwise, when the number "0" is set as the broadcast countermeasure information P16c, the NPU 11a determines that the broadcast countermeasure is invalid.

As a result of the determination, since the packet P becomes a target to be subjected to routing using the cache memory 11c in a case where the input packet P is the broadcast packet and the broadcast countermeasure is valid, it is determined that the packet P is required to be set as the necessity of enter to cache memory ("YES" at operation S312). In contrast, since the packet P becomes a target to be subjected to routing using the TCAM 11b in a case where the input packet P is not the broadcast packet or the broadcast countermeasure is invalid, it is determined that the packet P is required to be set as the non-necessity of enter to cache memory ("NO" at operation S312).

Further, the NPU 11a of the packet routing apparatus 10 performs the setting of valid or invalid with respect to the broadcast countermeasure information P16c by, for example, referring to the setting within its own apparatus at the time when, for example, the packet P is input. Otherwise, in a state where the information to instruct to confirm the setting within the packet routing apparatus 10 is stored in the broadcast countermeasure information P16c, the NPU 11a of the packet routing apparatus 10 may be allowed to confirm the setting within its own apparatus according to the instruction at the time when, for example, the packet P is input. Further, the broadcast packet may be a multicast packet and the broadcast countermeasure information P16c may be multicast countermeasure information.

As described above, the NPU 11a of the packet routing apparatus 10 determines whether a plurality of destinations exist for the packet P. When it is determined that the plurality of destinations does not exist for the packet P, the NPU 11a performs the routing of the packet P using the TCAM 11b and otherwise, when the plurality of destinations exist, the NPU 11a performs the routing of the packet P using the cache memory 11c. Since the broadcast packet is forwarded to all the domains (e.g., destination cards and destination ports) within the packet routing apparatus 10, the broadcast packet becomes a cause for a significant increase in loads of apparatus as well as the TCAM 11b. According to the packet routing apparatus 10 of Modified Example 2, the NPU 11a preferentially performs the routing using the cache memory 11c for the broadcast packet as a countermeasure for a broadcast storm. Accordingly, since the opportunity that the cache memory 11c is used in the routing increases even when, for example, a large amount of packets are broadcasted simultaneously from a malicious user, accesses to the TCAM 11b are not concentrated and thus the load of the TCAM 11b is reduced. As a result, the power consumption of the TCAM 11b is suppressed.

Modified Example 3

Next, descriptions will be made on Modified Example 3. The difference between Modified Example 3 and the embodiment is the determination criteria as to whether the cache memory is to be used in the routing. Specifically, in the embodiment, the packet routing apparatus 10 determines as to whether the cache memory 11$c$ is required to be used based on the packet length of the input packet. In contrast, in Modified Example 3, the packet routing apparatus 10 determines as to whether the cache memory 11$c$ is required to be used based on whether the input packet both has the same packet length and the Ethernet (registered trademark) header as those of a packet which is input immediately before. Hereinafter, descriptions will be made based mainly on a difference between Modified Example 3 and the embodiment.

Figure 14:
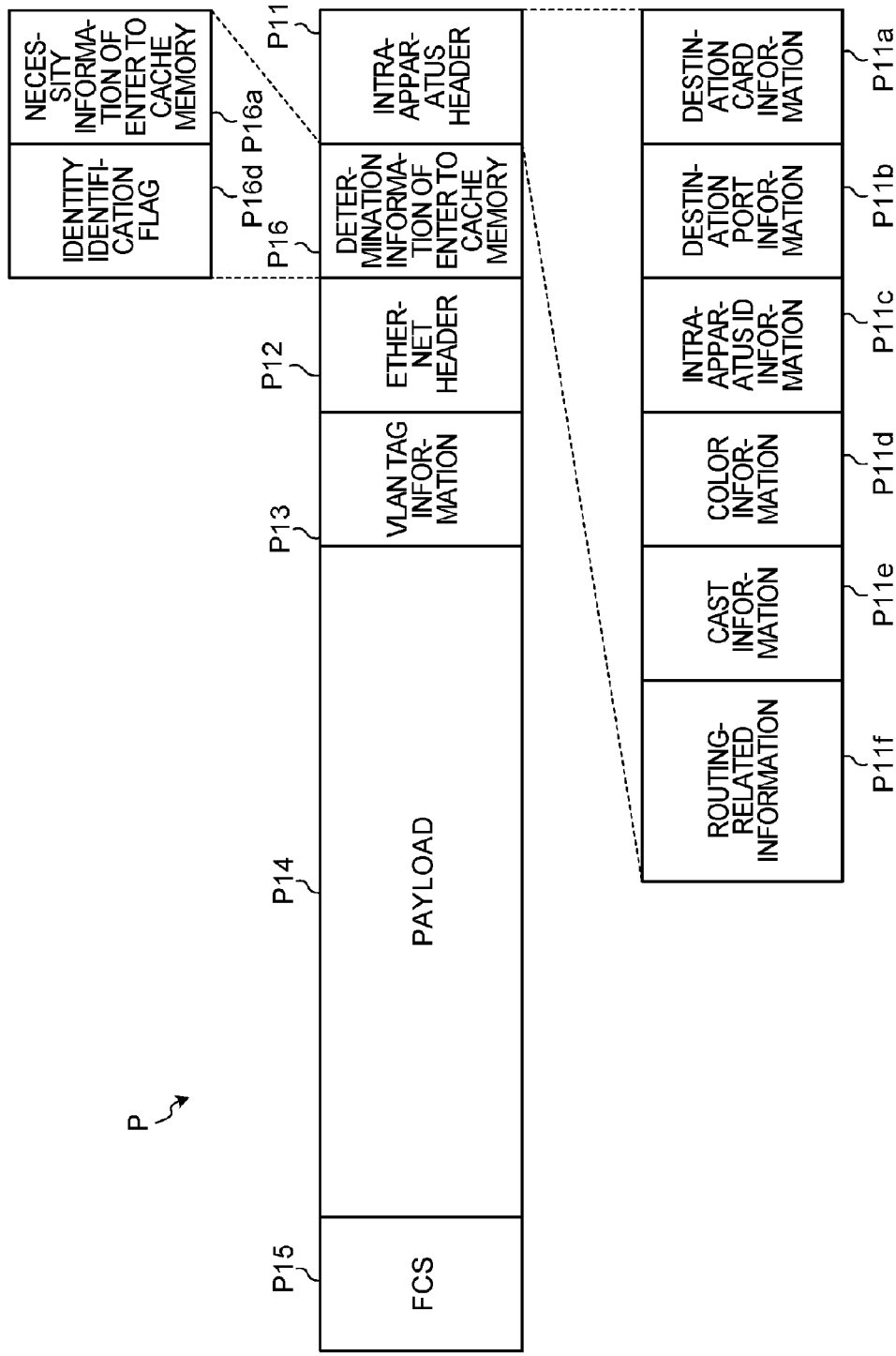
FIG. 14 is a view illustrating an example of a structure of packet P in Modified Example 3.

The packet routing apparatus according to Modified Example 3 has the same configuration as that of the packet routing apparatus 10 according to the embodiment described above as illustrated in FIG. 1. Accordingly, in Modified Example 3, the same reference numerals are used for the constitutional elements which are common between the embodiment and Modified Example 3, and illustration and descriptions thereof will be omitted. FIG. 14 is a view illustrating an example of a structure of packet P in Modified Example 3. As illustrated in FIG. 14, the packet P in Modified Example 3 has the same structure as that of the packet P illustrated in FIG. 8 except that an identity identification flag P16$d$ is included in the determination information of enter to cache memory P16. Accordingly, the same reference numerals are used for the constitutional elements which are common between FIG. 8 and FIG. 14, and detailed descriptions thereof will be omitted.

The identity identification flag P16$d$ is used for determining which of the TCAM 11$b$ and the cache memory 11$c$ is to be used as a memory for the routing of the input packet P. For example, when the number "1" is set in the identity identification flag P16$d$, the path information of the packet P is acquired from the cache memory 11$c$ and otherwise, when the number "0" is set, the path information of the packet P is acquired from the associative memory 11$f$ through the TCAM 11$b$.

The identity identification flag P16$d$ of the packet P is set through the collation of the packet P with a packet which is input immediately before the packet P by the NPU 11$a$. That is, the NPU 11$a$ compares the packet length and an Ethernet (registered trademark) header of the packet which is input immediately before the packet P with the packet length and the Ethernet (registered trademark) header of the packet P, respectively. As a result of the comparison, when the packet lengths and the Ethernet (registered trademark) headers are coincident with each other between the packet P and the packet which is input immediately before the packet P, respectively, the NPU 11$a$ sets the number "1" in the identity identification flag P16$d$ and otherwise, when the packet lengths or the Ethernet (registered trademark) headers are not coincident with each other between the packet P and the packet, respectively, the NPU 11$a$ sets the number "0" in the identity identification flag P16$d$. Further, the determination as to whether the Ethernet (registered trademark) header of an input packet is coincident with the Ethernet (registered trademark) header of the packet which is input immediately before the input packet may not be a determination as to whether the Ethernet (registered trademark) headers are completely coincident with each other but may be a determination as to whether the Ethernet (registered trademark) headers are partially coincident with each other (e.g., forward coincidence, rearward coincidence) instead.

Figure 15:
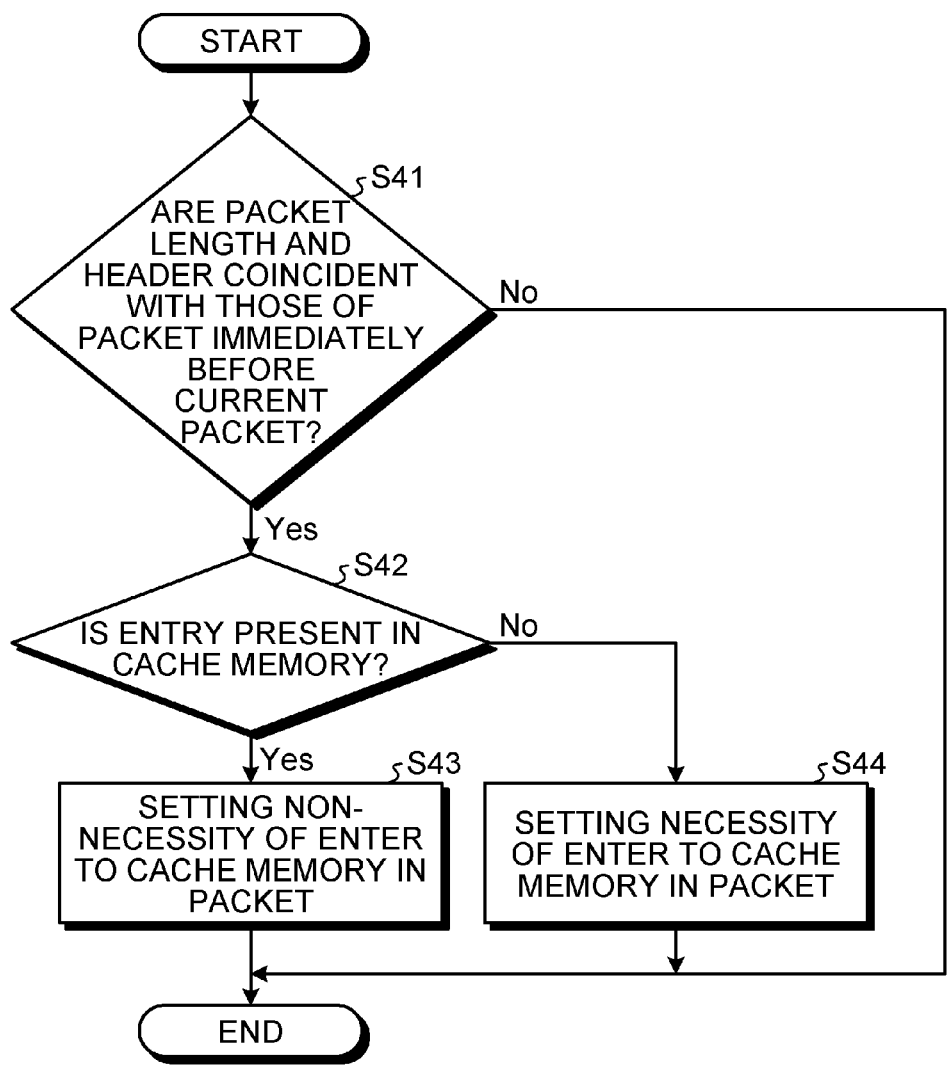
FIG. 15 is a flowchart for explaining a process of determining whether the cache memory is to be used when acquiring path information in Modified Example 3.

Next, the operations of the packet routing apparatus 10 in Modified Example 3 will be described based mainly on the difference between Modified Example 1 and the embodiment. FIG. 15 is a flowchart for explaining a process of determining whether the cache memory is to be used when acquiring the path information in Modified Example 3. Since the process of FIG. 15 includes the same processings as those of FIG. 7 which are referenced in explaining the operations according to the embodiment, the operations which are common between the processes of FIG. 7 and FIG. 11 are assigned the reference numerals of which end portions are the same with each other, and detailed descriptions thereof will be omitted. Specifically, respective processings of the operations S42 to S44 of FIG. 15 correspond to those of the operations S12 to S14 of FIG. 7.

At operation S41 which is unique to Modified Example 3, when the packet P is input, the NPU 11$a$ of the packet routing apparatus 10 refers to the identity identification flag P16$d$ of the packet P (see, e.g., FIG. 14) to determine whether the packet length and the Ethernet (registered trademark) header of the input packet are coincident with those of the packet which is input immediately before the packet P. For example, when the number "1" is set as the identity identification flag P16$d$, the NPU 11$a$ determines that the packet lengths and the Ethernet (registered trademark) headers are coincident with each other, respectively, between the packet P and a packet which is input immediately before the packet P. In the meantime, when the number "0" is set as the identity identification flag P16$d$, the NPU 11$a$ determines that the packet lengths and the Ethernet (registered trademark) headers are not coincident with each other, respectively, between the packet P and a packet which is input immediately before the packet P.

As a result of the determination, since the packet P becomes a target to be subjected to routing using the cache memory 11$c$ in a case where the packet lengths and the Ethernet (registered trademark) headers are coincident with each other, respectively, it is determined that the packet P is required to be set as the necessity of enter to cache memory ("YES" at operation S41). In contrast, since the packet P becomes a target to be subjected to routing using the TCAM 11$b$ in a case where the packet lengths and the Ethernet (registered trademark) headers are not coincident with each other, respectively, it is determined that the packet P is required to be set as the non-necessity of enter to cache memory ("NO" at operation S41).

As described above, the NPU 11$a$ of the packet routing apparatus 10 determines whether the packet P has the same packet length and the same header as those of a packet which is input immediately before the packet P. When it is determined that the packet P does not have the same packet length or the same header as that of the packet which is input immediately before the packet P, the NPU 11$a$ performs the routing of the packet P using the TCAM 11$b$ and otherwise, when the packet P has the same packet length and the same header as those of the packet, the NPU 11$a$ performs the routing of the packet P using the cache memory 11$c$.

In a large scale network having a great number of routes (e.g., the Internet), a large sized data is frequently transmitted and received by being divided into packets each having a predetermined length. Further, in such a data transmission by dividing into packets, a plurality of packets each of which has the same packet length and the same Ethernet (registered trademark) header are frequently transmitted and received successively. Therefore, according to the packet routing apparatus 10 of Modified Example 3, the NPU 11a does not use the TCAM 11b for each routing of the packets received successively and regards only the first packet as a target to be subjected to routing using the TCAM 11b. That is, the NPU 11a acquires the path information of the first packet from the associative memory 11f through the TCAM 11b and then stores the path information in the cache memory 11c as a cache entry first and performs the routing of subsequent packets using the cache memory 11c. Accordingly, the load of the TCAM 11b is reduced and the power consumption of the TCAM 11b is suppressed as compared to a case where the TCAM 11b is used in the routing of all the packets that constitute a large sized data.

Further, only in Modified Example 2 among the embodiment and Modified examples 1 to 3, the NPU 11a of the packet routing apparatus 10 confirms as to whether the setting within its own apparatus is valid or invalid. However, without being limited thereto, also in the embodiment and Modified Examples 1 and 3, the NPU 11a of the packet routing apparatus 10 may determine whether the use of the cache memory 11 is to be permitted based on the setting within its own apparatus. For example, in the embodiment, in a case where the packet length of the input packet P is less than the predetermined value, the NPU 11a uses the cache memory 11c for the routing regardless of whether the setting within the apparatus is valid or invalid. However, the NPU 11a of the packet routing apparatus 10 may be allowed to use the cache memory 11c only when the packet length of the input packet P is less than the predetermined value and further, the setting within the apparatus is valid. Accordingly, the load of the packet routing apparatus 10 with respect to the TCAM 11b and the cache memory 11c may be adjusted more flexibly according to the setting by, for example, a user. For example, when the predetermined value of the packet length is large and the load of the cache memory 11c is excessively increased as compared to the TCAM 11b, the packet routing apparatus 10 temporarily invalidates the setting within its own apparatus and thus, an operation which reduces the load of the cache memory 11c becomes possible.

Further, as described above, since the cache memory 11c allows the smaller number of entries as compared to the TCAM 11b, it is concerned that the number of entries of the path information allowed to be stored into the cache memory 11c exceeds a permissible value. Therefore, when the number of entries of the cache memory 11c reaches a predetermined value (e.g., 800 entries), the NPU 11a of the packet routing apparatus 10 may rigidly set a condition of enter to cache memory. Specifically, when the number of entries of the cache memory 11c reaches the predetermined value, the NPU 11a may decrease a threshold value of a packet length, which becomes the determination criteria as to whether enter to cache memory is needed, for example, from 100 bytes to 50 bytes. Otherwise, when the number of entries of the cache memory 11c reaches the predetermined value, the NPU 11a may decrease the number of packets to be preferentially entered to cache memory. Accordingly, the packet routing apparatus 10 may suppress an amount of data of the path information allowed to be stored in the cache memory 11c as the entry, so that it becomes possible to prevent in advance the path information from exceeding a permissible value to be entered in the cache memory.

Further, in the embodiment, the NPU 11a of the packet routing apparatus 10 performs a determination on a single packet as to whether the single packet is required to be stored in the cache memory as an entry based on the packet length. However, without being limited thereto, the NPU 11a may determine using a plurality of packets whether the cache memory 11c is to be used. For example, in a case where a plurality of packets (e.g., three packets) that are input successively are grouped and an average of the packet lengths of these packets is less than a predetermined value, the NPU 11a may be allowed to enter the path information of all the packets within the group to cache memory. In such an aspect, when the average of the packet lengths is greater than or equal to the predetermined value, the path information of the packets belonging to the group is not allowed to enter to cache memory. Accordingly, even when of a packet length of a single packet is less than the predetermined value, the cache memory 11c is not used as long as an average of the packet lengths of a plurality of packet including the packet does not become less than the predetermined value. Accordingly, the packet routing apparatus 10 may perform the determination as to whether the packet is required to be stored in cache memory as an entry at a higher accuracy and reduce use frequency of the cache memory 11c according to the routing.

Further, in Modified Example 3, the packet routing apparatus 10 uses the cache memory 11c in a case where both the packet lengths and the Ethernet (registered trademark) headers are coincident with each other between the packet P and the packet which is input immediately before the packet P, respectively, but the packet routing apparatus 10 may use the cache memory 11c in a case where the packet lengths or the Ethernet (registered trademark) headers are coincident with each other between the packet P and the packet which is input immediately before the packet P. For example, the packet routing apparatus 10 may use the cache memory 11c in a case where the packet lengths are coincident with each other. Further, the packet length may not necessarily be an entire length of the packet P and may be, for example, a payload length. Also, the header may not necessarily be the Ethernet (registered trademark) header and may be, for example, an intra-apparatus header.

In the embodiment and Modified Examples 1 to 3, the cache memory 11c stores the path information in addition to the routing source information. However, similarly to the TCAM 11b, the routing source information may be stored in the cache memory 11c and the path information may be stored in a memory (e.g., DRAM, SRAM) separately from the cache memory 11c as well.

Further, in the embodiment and Modified Examples 1 to 3, the layer 2 switch is assumed as the packet routing apparatus 10, but, for example, a layer 3 switch may also be used as the packet routing apparatus 10. Further, the TCAM 11b may be a BCAM (Binary Content Addressable Memory) and the MAC address table 11b-1 may be a routing table.

Further, the IF cards provided on the packet routing apparatus 10 are not limited to two IF cards 11 and 14, but may include three or more IF cards. Further, a determination function of enter to cache memory equipped in each IF card is not necessarily to adopt the same determination method between respective IF cards. For example, a different determination to enter to cache memory may be employed for each IF card, for example, in such a manner that the determination method according to the embodiment is employed for the IF card 11 and the determination method according to Modified Example 1 is employed for the IF card 14. Accordingly, it becomes possible to achieve the routing having a higher applicability according to characteristic, use or use situation of each IF card.

Further, in the embodiment and each Modified Example, respective constitutional elements of the packet routing apparatus 10 illustrated in the drawings are not necessarily configured to be physically the same as those illustrated. That is, a specific shape of distribution and integration of the respective devices is not limited to a shape illustrated and all or some of the devices may be configured to be functionally and physically distributed and integrated in a certain device according to various loads or use situation. For example, the IF card 11 may be configured to integrate the TCAM 11b and the associative memory 11f as a single constitutional element (memory) and the NPU 11a may be configured to acquire the path information from the memory. Further, the TM11d and the CPU-IF11e, or the switch card 12 and the control card 13 may be integrated as a single constitutional element, respectively. In contrast, the NPU 11a of the IF card 11 may be configured in such a way that, for example, a portion of determining whether the cache memory 11c is to be used, a portion of detecting the path of the packet and a portion of determining whether the path information is to be stored in the cache memory 11c may be provided individually and distributively. Further, the memory such as the TCAM 11b may be connected to the packet routing apparatus 10 via network or a cable as an external device of the packet routing apparatus 10.

Further, in the above description, an individual configuration or operation is described for each embodiment and Modified Examples. However, the packet routing apparatus 10 according to the embodiment may further include the constitutional element unique to respective Modified Examples 1 to 3. Further, a combination of the embodiment and each of Modified Examples 1 to 3 may not be limited to a combination of two types of the embodiment and each of Modified Examples 1 to 3, and may be formed of any type of, for example, a combination of three or more types of the embodiment and each of Modified Examples 1 to 3. For example, the determination function to enter to cache memory based on the priority of Modified Example 1 may be employed in Modified Example 2 or Modified Example 3 without being limited to the embodiment. Further, a single packet routing apparatus 10 may also be equipped with all the functions described in the embodiment and Modified Examples 1 to 3.

For example, in a case where the embodiment is combined with Modified Example 1, the NPU 11a of the packet routing apparatus 10 further determines whether a setting indicative of use of the cache memory 11c for the routing of the packet P is present in a case where the packet length of the packet P is greater than or equal to the predetermined value. When it is determined that the setting is present, the NPU 11a performs the routing of the packet P1 using the cache memory 11c regardless of the packet length of the packet P (even though the packet length is greater than or equal to the predetermined value). In the meantime, when it is determined that the setting is absent, the NPU 11a performs the routing of the packet P1 using the TCAM 11b. Accordingly, the routing using the cache memory 11c may be expanded to a case where the setting is present in addition to a case where the packet length of the packet P is shorter than the predetermined value. Accordingly, the power consumption according to the accessing to the TCAM 11b is further suppressed.

Similarly, in a case where the embodiment is combined with Modified Example 2, the NPU 11a of the packet routing apparatus 10 further determines whether a plurality of destinations exist for the packet P in a case where the packet length of the packet P is greater than or equal to the predetermined value. When it is determined that a plurality of destinations of the packet P exist, the NPU 11a performs the routing of the packet P1 using the cache memory 11c regardless of the packet length of the packet P (even though the packet length is greater than or equal to the predetermined value). In the meantime, when it is determined that a plurality of destinations of the packet P do not exist, the NPU 11a performs the routing of the packet P1 using the TCAM 11b. Accordingly, the routing using the cache memory 11c may be expanded to a case where a plurality of destinations exist for the packet in addition to a case where the packet length of the packet P is shorter than the predetermined value. Accordingly, the power consumption according to accessing to the TCAM 11b is further suppressed.

Similarly, in a case where the embodiment is combined with Modified Example 3, the NPU 11a of the packet routing apparatus 10 further determines whether the packet P has a packet length which is equal to that of a packet which is input immediately before the packet P in a case where the packet length of the packet P is greater than or equal to the predetermined value. When it is determined that the packet P has the packet length which is equal to that of the packet, the NPU 11a performs the routing of the packet P1 using the cache memory 11c regardless of the packet length of the packet P (even though the packet length is greater than or equal to the predetermined value). In the meantime, when it is determined that the packet P does not have the packet length which is equal to that of the packet, the NPU 11a performs the routing of the packet P1 using the TCAM 11b. Accordingly, the routing using the cache memory 11c may be expanded to a case where the packet length of the packet P is equal to that of the packet in addition to a case where the packet length of the packet P is shorter than the predetermined value. Accordingly, the power consumption according to accessing to the TCAM 11b is further suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet routing apparatus comprising:
   a plurality of interface circuits each including a plurality of ports configured to transmit and receive a packet; and
   a switch circuit configured to transmit the packet received from one of the plurality of ports to other ports, based on a destination address of the packet,
   wherein each of the plurality of interface circuits includes,
   a first memory in which a plurality of routing information used in a routing of the packet are stored,
   a second memory in which a portion of the plurality of routing information is stored, the number of the routing information stored in the second memory being smaller than the number of the routing information stored in the first memory, and
   a processor configured to detect a packet length of the packet received at any of the plurality of ports, perform the routing based on the portion of the plurality of routing information stored in the second memory when the detected packet length is less than a predetermined value, and perform the routing based on the plurality of routing information stored in the first memory when the detected packet length is greater than or equal to the predetermined value, the processor being further configured to further determine whether the packet has a packet length which is equal to a packet length of a packet which is received immediately before when the packet length is greater than or equal to the predetermined value, and perform the routing based on the portion of the plurality of routing information stored in the second memory when the packet has the packet length which is equal to the packet length of the packet which is received immediately before.

2. The packet routing apparatus according to claim 1, wherein the processor is configured to further determine whether a setting to use the portion of the plurality of routing information stored in the second memory for the routing is present when the packet length is greater than or equal to the predetermined value, and perform the routing based on the portion of the plurality of routing information stored in the second memory when the setting to use the portion of the plurality of routing information stored in the second memory for the routing is present.

3. The packet routing apparatus according to claim 1, wherein the processor is configured to further determine whether a plurality of destinations of the packet exist when the packet length is greater than or equal to the predetermined value, and perform the routing based on the portion of the plurality of routing information stored in the second memory when the plurality of destinations of the packet exist.

4. The packet routing apparatus according to claim 1, wherein the processor is configured to store the routing information in the second memory when the packet length of the packet is less than the predetermined value and the routing information of the packet is not stored in the second memory.

5. An interface circuit including a plurality of ports configured to transmit and receive a packet, the interface circuit comprising:
   a first memory in which a plurality of routing information used in a routing of the packet are stored;
   a second memory in which a portion of the plurality of routing information are stored, the number of the routing information stored in the second memory being smaller than the number of the routing information stored in the first memory, and
   a processor configured to detect a packet length of the packet received at any of the plurality of ports, perform the routing based on the portion of the plurality of routing information stored in the second memory when the detected packet length is less than a predetermined value, and perform the routing based on the plurality of routing information stored in the first memory when the detected packet length is greater than or equal to the predetermined value,
   the processor being further configured to further determine whether the packet has a packet length which is equal to a packet length of a packet which is received immediately before when the packet length is greater than or equal to the predetermined value, and perform the routing based on the portion of the plurality of routing information stored in the second memory when the packet has the packet length which is equal to the packet length of the packet which is received immediately before.

6. A packet routing method in which a packet is received from one of a plurality of paths and the packet is transmitted to the other path based on a destination of the packet, the packet routing method comprising:
   storing a plurality of routing information used in a routing of the packet in a first memory;
   storing a portion of the plurality of routing information in a second memory, the number of the routing information stored in the second memory being smaller than the routing information stored in the first memory;
   detecting a packet length of the packet received at a port; and
   performing the routing of the packet based on the portion of the plurality of routing information stored in the second memory when the detected packet length is less than a predetermined value, and performing the routing based on the plurality of routing information stored in the first memory when the detected packet length is greater than or equal to the predetermined value; and
   determining whether the packet has a packet length which is equal to a packet length of a packet which is received immediately before when the packet length is greater than or equal to the predetermined value, and performing the routing based on the portion of the plurality of routing information stored in the second memory when the packet has the packet length which is equal to the packet length of the packet which is received immediately before.

* * * * *